United States Patent
Joyal et al.

(10) Patent No.: US 12,529,047 B1
(45) Date of Patent: Jan. 20, 2026

(54) mRNA QUANTIFICATION METHODS

(71) Applicant: ModernaTX, Inc., Cambridge, MA (US)

(72) Inventors: John Joyal, Cambridge, MA (US); Penggao Duan, Cambridge, MA (US); Kristian Link, Cambridge, MA (US); Nicholas J. Amato, Cambridge, MA (US); Huijuan Li, Cambridge, MA (US)

(73) Assignee: ModernaTX, Inc., Cambridge, MA (US)

( * ) Notice: Subject to any disclaimer, the term of this patent is extended or adjusted under 35 U.S.C. 154(b) by 612 days.

(21) Appl. No.: 18/085,457

(22) Filed: Dec. 20, 2022

Related U.S. Application Data

(60) Provisional application No. 63/292,298, filed on Dec. 21, 2021.

(51) Int. Cl.
C12N 15/00 (2006.01)
C12N 15/10 (2006.01)

(52) U.S. Cl.
CPC ................................ *C12N 15/1006* (2013.01)

(58) Field of Classification Search
None
See application file for complete search history.

(56) References Cited

U.S. PATENT DOCUMENTS

| | | | |
|---|---|---|---|
| 5,677,124 | A | 10/1997 | DuBois et al. |
| 5,853,990 | A | 12/1998 | Winger et al. |
| 6,096,503 | A | 8/2000 | Sutcliffe et al. |
| 8,304,183 | B2 | 11/2012 | Sooknanan |

(Continued)

FOREIGN PATENT DOCUMENTS

| | | |
|---|---|---|
| EP | 2092064 | 9/2010 |
| WO | WO 1999/042618 | 8/1999 |

(Continued)

OTHER PUBLICATIONS

Strezsak et al., Complete enzymatic digestion of double-stranded RNA to nucleosides enables accurate quantification of dsRNA, Anal. Methods, 2021,13, 179-185, published Dec. 8, 2020.*

(Continued)

*Primary Examiner* — Aaron A Priest
(74) *Attorney, Agent, or Firm* — Wolf, Greenfield & Sacks, P.C.

(57) ABSTRACT

Provided herein are methods for determining a concentration of RNA (e.g. mRNA) in a solution. Certain aspects of the disclosure relate to digesting the target RNA polymer by adding a base to a solution of RNA, optionally comprising at least one chemically modified nucleotide, and incubating the mixture to digest the RNA into a plurality of nucleotides. Certain other aspects of the disclosure relate to measuring the absorbance of the digested RNA mixture at 260 nm; while other aspects relate to using the absorbance measurement with a value of a relative percent of each nucleotide in the digestion mixture, and a mass-corrected coefficient of each nucleotide in the mixture to determine a concentration of the RNA. Other aspects of the disclosure relate to measuring the concentration of RNA in a solution using computer-implemented techniques.

30 Claims, 6 Drawing Sheets

(56) References Cited

U.S. PATENT DOCUMENTS

| | | |
|---|---|---|
| 8,383,340 B2 | 2/2013 | Ketterer et al. |
| 8,710,200 B2 | 4/2014 | Schrum et al. |
| 8,754,062 B2 | 6/2014 | De Fougerolles et al. |
| 8,822,663 B2 | 9/2014 | Schrum et al. |
| 8,980,864 B2 | 3/2015 | Hoge et al. |
| 8,999,380 B2 | 4/2015 | Bancel et al. |
| 9,221,891 B2 | 12/2015 | Bancel et al. |
| 9,283,287 B2 | 3/2016 | Bancel et al. |
| 9,303,079 B2 | 4/2016 | Bancel et al. |
| 9,464,124 B2 | 10/2016 | Bancel et al. |
| 9,512,456 B2 | 12/2016 | Wang et al. |
| 9,533,047 B2 | 1/2017 | de Fougerolles et al. |
| 9,572,896 B2 | 2/2017 | Bancel et al. |
| 9,597,380 B2 | 3/2017 | Chakraborty et al. |
| 9,675,668 B2 | 6/2017 | Bancel et al. |
| 9,868,691 B2 | 1/2018 | Benenato et al. |
| 9,872,900 B2 | 1/2018 | Ciaramella et al. |
| 10,023,626 B2 | 7/2018 | Bolen et al. |
| 10,064,934 B2 | 9/2018 | Ciaramella et al. |
| 10,064,935 B2 | 9/2018 | Ciaramella et al. |
| 10,124,055 B2 | 11/2018 | Ciaramella et al. |
| 10,207,010 B2 | 2/2019 | Besin et al. |
| 10,232,055 B2 | 3/2019 | Kariko et al. |
| 10,273,269 B2 | 4/2019 | Ciaramella |
| 10,286,086 B2 | 5/2019 | Roy et al. |
| 10,323,076 B2 | 6/2019 | Ellsworth et al. |
| 10,385,088 B2 | 8/2019 | Fraley et al. |
| 10,449,244 B2 | 10/2019 | Ciaramella et al. |
| 10,465,190 B1 | 11/2019 | Chen et al. |
| 10,493,143 B2 | 12/2019 | Ciaramella et al. |
| 10,526,629 B2 | 1/2020 | Rabideau et al. |
| 10,653,712 B2 | 5/2020 | Hoge |
| 10,653,767 B2 | 5/2020 | Ciaramella et al. |
| 10,695,419 B2 | 6/2020 | Ciaramella et al. |
| 10,857,105 B2 | 12/2020 | Benenato et al. |
| 10,925,958 B2 | 2/2021 | Ciaramella |
| 11,027,025 B2 | 6/2021 | Hoge et al. |
| 11,045,540 B2 | 6/2021 | Ciaramella |
| 11,103,578 B2 | 8/2021 | Ciaramella et al. |
| 11,351,242 B1 | 6/2022 | Lori et al. |
| 11,384,352 B2 | 7/2022 | Miracco |
| 11,406,703 B2 | 8/2022 | Kramarczyk et al. |
| 11,464,848 B2 | 10/2022 | Ciaramella et al. |
| 11,485,960 B2 | 11/2022 | Dousis et al. |
| 11,497,807 B2 | 11/2022 | Ciaramella et al. |
| 11,564,893 B2 | 1/2023 | Smith |
| 11,576,961 B2 | 2/2023 | Ciaramella et al. |
| 2005/0032730 A1 | 2/2005 | Von Der Mulbe et al. |
| 2005/0059624 A1 | 3/2005 | Hoerr et al. |
| 2008/0274463 A1 | 11/2008 | Chen et al. |
| 2010/0129877 A1 | 5/2010 | Sahin et al. |
| 2011/0086904 A1 | 4/2011 | Russell |
| 2011/0097716 A1 | 4/2011 | Natt et al. |
| 2013/0102034 A1 | 4/2013 | Schrum et al. |
| 2013/0236974 A1 | 9/2013 | De Fougerolles |
| 2013/0245103 A1 | 9/2013 | de Fougerolles et al. |
| 2013/0259923 A1 | 10/2013 | Bancel et al. |
| 2014/0147432 A1 | 5/2014 | Bancel et al. |
| 2014/0148502 A1 | 5/2014 | Bancel et al. |
| 2014/0193482 A1 | 7/2014 | Bancel et al. |
| 2014/0206752 A1 | 7/2014 | Afeyan et al. |
| 2014/0328825 A1 | 11/2014 | Meis et al. |
| 2014/0378538 A1 | 12/2014 | Bancel |
| 2015/0051268 A1 | 2/2015 | Bancel et al. |
| 2015/0056253 A1 | 2/2015 | Bancel et al. |
| 2015/0141499 A1 | 5/2015 | Bancel et al. |
| 2015/0307542 A1 | 10/2015 | Roy et al. |
| 2015/0315541 A1 | 11/2015 | Bancel et al. |
| 2016/0024140 A1 | 1/2016 | Issa et al. |
| 2016/0024141 A1 | 1/2016 | Issa et al. |
| 2016/0032273 A1 | 2/2016 | Shahrokh et al. |
| 2016/0038612 A1 | 2/2016 | Hoge et al. |
| 2016/0243221 A1 | 8/2016 | Hoge et al. |
| 2017/0043037 A1 | 2/2017 | Kariko et al. |
| 2017/0130255 A1 | 5/2017 | Wang et al. |
| 2017/0202979 A1 | 7/2017 | Chakraborty et al. |
| 2017/0204152 A1 | 7/2017 | Nelson et al. |
| 2018/0000953 A1 | 1/2018 | Almarsson et al. |
| 2018/0002393 A1 | 1/2018 | Bancel et al. |
| 2018/0214537 A1 | 8/2018 | Mutzke et al. |
| 2018/0237849 A1 | 8/2018 | Thompson |
| 2018/0243225 A1 | 8/2018 | Ciaramella |
| 2018/0256628 A1 | 9/2018 | Hoge et al. |
| 2018/0271795 A1 | 9/2018 | Martini et al. |
| 2018/0271970 A1 | 9/2018 | Ciaramella et al. |
| 2018/0273977 A1 | 9/2018 | Mousavi et al. |
| 2018/0274009 A1 | 9/2018 | Marquardt et al. |
| 2018/0303929 A1 | 10/2018 | Ciaramella et al. |
| 2018/0311336 A1 | 11/2018 | Ciaramella et al. |
| 2018/0311343 A1 | 11/2018 | Huang et al. |
| 2018/0318409 A1 | 11/2018 | Valiante et al. |
| 2018/0369374 A1 | 12/2018 | Frederick et al. |
| 2018/0371047 A1 | 12/2018 | Ticho et al. |
| 2019/0002890 A1 | 1/2019 | Martini et al. |
| 2019/0008938 A1 | 1/2019 | Ciaramella et al. |
| 2019/0085368 A1 | 3/2019 | Bancel et al. |
| 2019/0125839 A1 | 5/2019 | Frederick et al. |
| 2019/0175517 A1 | 6/2019 | Martini et al. |
| 2019/0175727 A1 | 6/2019 | Huang et al. |
| 2019/0192646 A1 | 6/2019 | Cohen et al. |
| 2019/0192653 A1 | 6/2019 | Hoge et al. |
| 2019/0275170 A1 | 9/2019 | Benenato et al. |
| 2019/0298657 A1 | 10/2019 | Martini et al. |
| 2019/0298658 A1 | 10/2019 | Benenato |
| 2019/0300906 A1 | 10/2019 | Martini et al. |
| 2019/0314292 A1 | 10/2019 | Benenato et al. |
| 2019/0336452 A1 | 11/2019 | Brader |
| 2019/0351040 A1 | 11/2019 | Valiante et al. |
| 2019/0382774 A1 | 12/2019 | Hoge et al. |
| 2019/0390181 A1 | 12/2019 | Benenato et al. |
| 2020/0032274 A1 | 1/2020 | Mauger et al. |
| 2020/0038499 A1 | 2/2020 | Narayanan et al. |
| 2020/0054737 A1 | 2/2020 | Ciaramella et al. |
| 2020/0069599 A1 | 3/2020 | Smith et al. |
| 2020/0085916 A1 | 3/2020 | Martini et al. |
| 2020/0109420 A1 | 4/2020 | Brito et al. |
| 2020/0129445 A1 | 4/2020 | Patel et al. |
| 2020/0129615 A1 | 4/2020 | Ciaramella et al. |
| 2020/0239869 A1 | 7/2020 | Issa et al. |
| 2020/0254086 A1 | 8/2020 | Hoge et al. |
| 2020/0282047 A1 | 9/2020 | Ciaramella et al. |
| 2020/0306191 A1 | 10/2020 | Schariter et al. |
| 2020/0338004 A1 | 10/2020 | Hansson et al. |
| 2020/0368162 A1 | 11/2020 | Martini |
| 2021/0046173 A1 | 2/2021 | Ciaramella et al. |
| 2021/0087135 A1 | 3/2021 | Benenato et al. |
| 2021/0163919 A1 | 6/2021 | Issa et al. |
| 2021/0206818 A1 | 7/2021 | Huang et al. |
| 2021/0217484 A1 | 7/2021 | Giessel et al. |
| 2021/0228707 A1 | 7/2021 | Mektar et al. |
| 2021/0268086 A1 | 9/2021 | Zhong et al. |
| 2021/0378980 A1 | 12/2021 | Horhota et al. |
| 2022/0031631 A1 | 2/2022 | Almarsson et al. |
| 2022/0047518 A1 | 2/2022 | Hennessy et al. |
| 2022/0054653 A1 | 2/2022 | Martini et al. |
| 2022/0062175 A1 | 3/2022 | Smith et al. |
| 2022/0125899 A1 | 4/2022 | Ashburn et al. |
| 2022/0145381 A1 | 5/2022 | Elich et al. |
| 2022/0236253 A1 | 7/2022 | Hopson |
| 2022/0241399 A1 | 8/2022 | Lusso et al. |
| 2022/0347292 A1 | 11/2022 | Panther et al. |
| 2022/0348900 A1 | 11/2022 | Shamashkin et al. |
| 2022/0349006 A1 | 11/2022 | Amato et al. |
| 2023/0000970 A1 | 1/2023 | Nachbagauer et al. |

FOREIGN PATENT DOCUMENTS

| | | |
|---|---|---|
| WO | WO 2008/077592 A1 | 7/2008 |
| WO | WO 2011/069587 A1 | 6/2011 |
| WO | WO 2011/102802 A1 | 8/2011 |
| WO | WO 2014/004281 A1 | 1/2014 |
| WO | WO 2014/159813 A1 | 10/2014 |
| WO | WO 2014/160243 A1 | 10/2014 |
| WO | WO 2015/188933 A1 | 12/2015 |

(56) References Cited

FOREIGN PATENT DOCUMENTS

| | | |
|---|---|---|
| WO | WO 2016/051170 A1 | 4/2016 |
| WO | WO 2016/164762 A1 | 10/2016 |
| WO | WO 2016/201377 A1 | 12/2016 |
| WO | WO 2017/011773 A2 | 1/2017 |
| WO | WO 2017/015457 A1 | 1/2017 |
| WO | WO 2017/066789 A1 | 4/2017 |
| WO | WO 2017/070601 A1 | 4/2017 |
| WO | WO 2017/182524 A1 | 4/2017 |
| WO | WO 2018/232355 A1 | 12/2018 |
| WO | WO 2018/232357 A1 | 12/2018 |
| WO | WO 2019/030718 A1 | 2/2019 |
| WO | WO 2019/036683 A1 | 2/2019 |
| WO | WO 2020/097509 A1 | 11/2019 |
| WO | WO 2020/061367 A1 | 3/2020 |
| WO | WO 2020/190750 A1 | 9/2020 |
| WO | WO 2020/257612 A1 | 12/2020 |
| WO | WO 2021/050864 A1 | 3/2021 |
| WO | WO 2021/155243 A1 | 8/2021 |
| WO | WO 2021/155274 A1 | 8/2021 |
| WO | WO 2021/159040 A2 | 8/2021 |
| WO | WO 2021/159130 A2 | 8/2021 |
| WO | WO 2021/211343 A1 | 10/2021 |
| WO | WO 2021/222304 A1 | 11/2021 |
| WO | WO 2021/231929 A1 | 11/2021 |
| WO | WO 2021/231963 A1 | 11/2021 |
| WO | WO 2021/237084 A1 | 11/2021 |
| WO | WO 2021/247817 A1 | 12/2021 |
| WO | WO 2022/067010 A1 | 3/2022 |
| WO | WO 2022/155524 A1 | 7/2022 |
| WO | WO 2022/155530 A1 | 7/2022 |
| WO | WO 2022/187698 A1 | 9/2022 |
| WO | WO 2022/204491 A1 | 9/2022 |
| WO | WO 2022/212191 A1 | 10/2022 |
| WO | WO 2022/212442 A1 | 10/2022 |
| WO | WO 2022/212711 A2 | 10/2022 |
| WO | WO 2022/221335 A1 | 10/2022 |
| WO | WO 2022/221336 A1 | 10/2022 |
| WO | WO 2022/221359 A1 | 10/2022 |
| WO | WO 2022/221440 A1 | 10/2022 |
| WO | WO 2022/232585 A1 | 11/2022 |
| WO | WO 2022/241103 A1 | 11/2022 |
| WO | WO 2022/266010 A1 | 12/2022 |
| WO | WO 2022/266012 A1 | 12/2022 |
| WO | WO 2022/266389 A1 | 12/2022 |
| WO | WO 2023/283642 A2 | 1/2023 |
| WO | WO 2023/283645 A1 | 1/2023 |
| WO | WO 2023/283651 A1 | 1/2023 |
| WO | WO 2023/014649 A1 | 2/2023 |
| WO | WO 2023/018773 A1 | 2/2023 |
| WO | WO 2023/018923 A1 | 2/2023 |
| WO | WO 2023/019181 A1 | 2/2023 |

OTHER PUBLICATIONS

Andrews-Pfannkoch et al., Hydroxyapatite-mediated separation of double-stranded DNA, single-stranded DNA, and RNA genomes from natural viral assemblages. Appl Environ Microbiol. Aug. 2010;76(15):5039-45. Epub Jun. 11, 2010.

Edmonds, Polyadenylate polymerases. Methods Enzymol. 1990;181:161-70.

Felden et al., Presence and location of modified nucleotides in *Escherichia coli* tmRNA: structural mimicry with tRNA acceptor branches. EMBO J. Jun. 1, 1998;17(11):3188-96. doi: 10.1093/emboj/17.11.3188.

Freeman et al., Quantitative RT-PCR: pitfalls and potential. Biotechniques. Jan. 1999;26(1):112-22, 124-5. doi: 10.2144/99261rv01.

Gong et al., Comparing ion-pairing reagents and sample dissolution solvents for ion-pairing reversed-phase liquid chromatography/electrospray ionization mass spectrometry analysis of oligonucleotides. Rapid Commun Mass Spectrom. Feb. 28, 2014;28(4):339-50. doi: 10.1002/rcm.6773.

Holzl et al., Analysis of biological and synthetic ribonucleic acids by liquid chromatography-mass spectrometry using monolithic capillary columns. Anal Chem. Jan. 15, 2005;77(2):673-80. doi: 10.1021/ac0487395.

Huang et al., Development of simple isocratic HPLC methods for siRNA quantitation in lipid-based nanoparticles. J Pharm Biomed Anal. Aug. 5, 2019;172:253-258. doi: 10.1016/j.jpba.2019.04.026. Epub Apr. 27, 2019.

Huber et al., Analysis of nucleic acids by on-line liquid chromatography—Mass spectrometry (Mass Spectrometry Reviews 2001, 20, pp. 310-343).

Jora et al., Detection of ribonucleoside modifications by liquid chromatography coupled with mass spectrometry. Biochim Biophys Acta Gene Regul Mech. Mar. 2019;1862(3):280-290. doi: 10.1016/j.bbagrm.2018.10.012. Epub Nov. 7, 2018.

Kern et al., Application of solution equilibrium analysis to in vitro RNA transcription. Biotechnol Prog. Nov.-Dec. 1997;13(6):747-56. doi: 10.1021/bp970094p.

Liu et al., Real-time monitoring in vitro transcription using molecular beacons. Anal Biochem. Jan. 1, 2002;300(1):40-5. doi: 10.1006/abio.2001.5446.

Nomura et al., Real-Time Monitoring of in vitro Transcriptional RNA by Using Fluorescence Correlation Spectroscopy. ChemBioChem. Dec. 3, 2004;5(12):1701-1703.

Sel-Lida et al., Real-time monitoring of in vitro transcriptional RNA synthesis using fluorescence resonance energy transfer. Nucleic Acids Res. Jun. 15, 2000;28(12):E59. doi: 10.1093/nar/28.12.e59.

Zhao et al., Detection and quantitation of RNA base modifications. RNA. Jun. 2004;10(6):996-1002. doi: 10.1261/rna.7110804.

\* cited by examiner mRNA QUANTIFICATION METHODS

RELATED APPLICATIONS

This application claims the benefit and priority under 35 U.S.C. § 119(e) of the filing date of U.S. Provisional Patent Application Ser. No. 63/292,298, filed Dec. 21, 2021. The entire contents of the aforementioned application are hereby incorporated by reference.

BACKGROUND

Messenger RNA (mRNA) is an emerging alternative to conventional small molecule and protein therapeutics due to the potency and programmability of mRNA. mRNA encoding a desired therapeutic protein can be administered to a subject for in vivo expression of the protein to exert therapeutic effect, such as vaccination or replacement of a protein encoded by a mutated gene. This requires analytical techniques to determine the precise concentration of the mRNA product. The current gold standard for determining mRNA concentration relies on the absorbance spectra of the intact RNA molecule and employs a generic standard coefficient (i.e. the inverse of the molar extinction coefficient) that is a function of the RNA structure (e.g. assumes RNA is single stranded); however, the absorbance spectra is often convoluted due to contributions from the mRNA structure, e.g. nearest neighbor influences and matrix effects.

SUMMARY

Provided herein are methods of quantifying the concentration of any ribonucleic acid (RNA) in a solution, optionally comprising one or more chemically modified nucleotides. The current standard for determining the RNA concentration in a solution involves taking the product of the absorbance of the solution, for example at 260 nm, and a universal standard coefficient multiplier, which is equal to the inverse of the approximated molar extinction coefficient (e.g. 1/0.025=40 microgram*cm/mL) for a single stranded RNA (assuming a 1 cm cell pathlength). However, the standard coefficient assumes the RNA is single stranded, does not contain any chemically modified nucleotides, and ignores confounding parameters such as solution pH and ionic strength. For instance, it is known that increasing the salt concentration induces RNAs to adopt secondary structures, which decreases the absorbance at 260 nm, leading to an underestimation of the RNA concentration.

In some aspects, a method for determining a concentration of mRNA in a mRNA solution is provided. The method comprises measuring an absorbance of a nucleotide solution comprising a plurality of nucleotides; and determining the concentration of the mRNA in the mRNA solution based on (i) the measured absorbance of the nucleotide solution and (ii) a sequence corrected molar extinction coefficient (SCC) associated with nucleotide monophosphates present in a digested mRNA mixture.

In some embodiments the plurality of nucleotides comprises intact mRNA. In some embodiments the nucleotide solution comprises intact mRNA, and wherein the concentration of the mRNA is determined based on a calibration curve generated from the digested mRNA mixture. In some embodiments the nucleotide solution is the mRNA solution. In some embodiments the nucleotide solution is not the digested mRNA mixture.

In some embodiments the plurality of nucleotides comprises a plurality of nucleotide monophosphates.

In some embodiments the nucleotide solution is the digested mRNA mixture.

In some embodiments the method further comprises digesting the mRNA in the mRNA solution to form the digested mRNA mixture.

In some aspects a method for preparing a set of sequence corrected molar extinction coefficient (SCC) values for an mRNA comprising digesting a mRNA mixture by adding a base to a solution of mRNA and incubating the mixture to digest the mRNA into nucleotide monophosphates; obtaining a plurality of mass-corrected coefficient values for each type of nucleotide in the digestion mixture and using the plurality of mass-corrected coefficient values; and obtaining a plurality of sequence corrected molar extinction coefficient (SCC) values associated with nucleotide monophosphates present in the digested mRNA mixture based on (i) the plurality of mass-corrected coefficient values for each type of nucleotide in the nucleotide solution and (ii) relative percentage values for each type of nucleotide in the nucleotide solution is provided.

The present disclosure provides, in some aspects, a method of determining a concentration of RNA in a solution, the method comprising digesting a mRNA mixture by adding a base to a solution of mRNA and incubating the mixture to digest the mRNA into nucleotide monophosphates; obtaining a plurality of mass-corrected coefficient values for each type of nucleotide in the digestion mixture; obtaining a plurality of sequence corrected molar extinction coefficient (SCC) values associated with nucleotide monophosphates present in the digested mRNA mixture based on (i) the plurality of mass-corrected coefficient values for each type of nucleotide in the nucleotide solution and (ii) relative percentage values for each type of nucleotide in the nucleotide solution; measuring the absorbance of the digested mixture; and, using the absorbance measurement and SCC to determine a concentration of the mRNA. In some embodiments the determined concentration of the mRNA in the mRNA solution is further based on a pathlength and a dilution factor.

In some embodiments, the base comprises sodium hydroxide.

In some embodiments, the sodium hydroxide concentration is at least 8N.

In some embodiments, the mixture is incubated at a temperature of about 60-70° C.

In some embodiments, the mixture is incubated for at least 30 min.

In some embodiments, an acid solution is added after the incubation to quench the digestion.

In some embodiments, the acid solution comprises hydrochloric acid.

In some embodiments, a buffer solution is added to the digested mixture.

In some embodiments, the buffer solution comprises sodium citrate.

In some embodiments, the buffer solution comprises a sodium citrate concentration of 1 mM-1M.

In some embodiments, the absorbance is measured at 260 nm.

In some embodiments, the chemically modified nucleotide is an N1-methyl-pseudouridine.

In some embodiments, the chemically modified nucleotide is a 5-methoxy-uridine.

In some embodiments, the chemically modified nucleotide is an N1-ethyl-pseudouridine.

In some aspects a computer-implemented method for outputting a concentration of mRNA in a mRNA solution is provided. The method comprises receiving or inputting an absorbance measurement of a nucleotide solution comprising a plurality of nucleotides; receiving or inputting one or more of (i) a sequence corrected molar extinction coefficient (SCC) associated with nucleotide monophosphates present in a digested mRNA mixture, (ii) a plurality of mass-corrected coefficient values, wherein the plurality comprises a mass-corrected coefficient value for each type of the nucleotide monophosphates in the digestion mixture, and (iii) relative percent values for each type of the nucleotide monophosphates in the digestion mixture; determining the concentration of the mRNA based on (i) the absorbance measurement of the nucleotide solution and (ii) the one or more of the SCC, the plurality of mass-corrected coefficient values, and the relative percent values; and outputting the concentration of the mRNA in the solution.

In some embodiments the plurality of nucleotides comprises intact mRNA.

In some embodiments the nucleotide solution comprises intact mRNA, and wherein concentration of the mRNA is determined based on a calibration curve generated from the digested mRNA mixture.

In some embodiments the nucleotide solution is the mRNA solution.

In some embodiments the nucleotide solution is not the digested mRNA mixture.

In some embodiments the plurality of nucleotides comprises a plurality of nucleotide monophosphates.

In some embodiments the nucleotide solution is the digested mRNA mixture.

In some embodiments the method further comprises digesting the mRNA in the mRNA solution to form the digested mRNA mixture.

In other aspects a method for determining a concentration of mRNA in a solution is provided. The method comprises at least one computer hardware processor to perform: obtaining an absorbance measurement of a nucleotide solution comprising a plurality of nucleotides; obtaining one or more of (i) a sequence corrected molar extinction coefficient (SCC) associated with nucleotide monophosphates present in a digested mRNA mixture, (ii) a plurality of mass-corrected coefficient values, wherein the plurality comprises a mass-corrected coefficient value for each type of the nucleotide monophosphates in the digestion mixture, and (iii) relative percent values for each type of the nucleotide monophosphates in the digestion mixture; determining the concentration of the mRNA based on (i) the absorbance measurement of the nucleotide solution and (ii) the one or more of the SCC, the plurality of mass-corrected coefficient values, and the relative percent values; and outputting the concentration of the mRNA in the solution.

In some embodiments the method further comprises adjusting the volume of the solution to achieve a therapeutic dose of the mRNA in the solution based on the calculated concentration of the mRNA in the solution. In some embodiments the mRNA concentration is determined using a plurality of mass-corrected coefficient values accounts for secondary structure and intramolecular interactions within the mRNA. In some embodiments the base comprises sodium hydroxide. In some embodiments the absorbance is measured at 260 nm using an ultraviolet visible spectrophotometer. In some non-limiting embodiments the spectrophotometer is selected from the group consisting of the Nanodrop 2000 spectrophotometer, the BioTek Synergy spectrophotometer, and the FLUOstar OMEGA.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
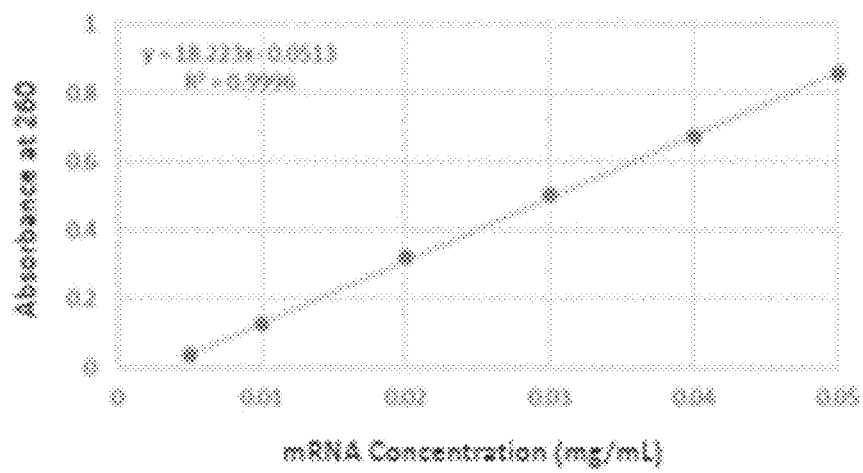
FIG. 1A illustrates a linear regression analysis performed on a plot of the absorbance at 260 nm as a function of mRNA-3 concentration, in some embodiments.

The present disclosure generally relates, in certain aspects, to an improved method for quantifying the concentration of RNA (e.g. mRNA) in a solution. The current standard for determining the RNA concentration fails to account for aspects of secondary structure and intramolecular interactions within an RNA, and thus can provide unreliable results. It has now been discovered that an absorbance measurement, for instance at 260, is less susceptible to influence by RNA structure, pH or salt concentration, if the RNA polymer is first broken down into its constituent NMP building blocks. Therefore, certain aspects of the present disclosure relate to methods for preparing a digested RNA mixture by adding a base to a solution of RNA and incubating the mixture to digest the RNA into a plurality of nucleotides. Recognizing that the standard coefficient used in the intact UV RNA quantification method does not accurately capture the spectral characteristics of the RNA, certain aspects of the present disclosure relate to the development of a sequence corrected coefficient (SCC) that accounts for (1) the relative percent of each NMP in the target RNA sequence and (2) the contribution of each NMP's extinction coefficient to the absorbance measurement. In some embodiments, an equation for the SCC may be derived from first principles. In another embodiment, the equation for the SCC may be approximated using Beer's law for mixtures (i.e. linear mixing rule). In some embodiments, the same SCC value is obtained regardless of which method is used to calculate the SCC. In some embodiments, the NMPs extinction coefficient is represented as a mass corrected coefficient (MCC) and is equal to the inverse of the extinction coefficient. In some embodiments, the concentration of RNA in a solution is determined using computer-implemented techniques. In other embodiments, the final revised equations for the quantification of any RNA polymer, optionally comprising any number of chemically modified nucleotides, using the UV absorption method, are provided herein.

Aspects of the disclosure relate to determining a concentration of an intact RNA, e.g., mRNA, in an RNA solution, e.g., mRNA solution using the known SCC values. In some embodiments, the absorbance at 260 nm of the RNA solution comprising the intact RNA is measured and used, in conjugation with the SCC values, to determine the concentration of the intact RNA in the RNA solution.

The disclosure in some aspects involves the creation of a SCC associated with nucleotide monophosphates present in a mRNA that can be used to determine a concentration of the mRNA in a sample, for instance, across batches of mRNA of a given sequence. The SCC values, which can be generated based on a digested sample of the mRNA can be used to characterize other samples or batches of the mRNA of the same sequence. In order to determine the concentration of an mRNA batch using these previously generated SCC values, the absorbance of the mRNA batch (also referred to herein as a nucleotide solution) is measured. Using the absorbance measurement and the SCC the concentration of the mRNA in the nucleotide solution is calculated.

Aspects of the present disclosure relate to methods for determining the concentration of a target ribonucleic acid (RNA) polymer in solution. A ribonucleic acid polymer (e.g. mRNA) typically comprises a plurality of nucleotide monophosphates (NMPs). An NMP includes an exchangeable organic base (which is either a substituted pyrimidine (e.g. cytosine (C) or uracil (U)) or a substituted purine (e.g. adenine (A) or guanine (G))), a five-carbon ribose sugar bearing a hydroxyl group at the 3' and 2' position, and a phosphate group. Non-limiting examples of ribonucleic acids include pri-mRNA, pre-mRNA, and mRNA. A ribonucleic acid (e.g., mRNA) may include a substitution and/or modification. In some embodiments, the substitution and/or modification is in one or more bases and/or sugars. For example, in some embodiments a nucleic acid (e.g., mRNA) includes nucleotides having an organic group, such as a methyl group, attached to a nucleic acid base at the N6 position. Thus, in some embodiments, an mRNA includes one or more N6-methyladenosine nucleotides. A phosphate, sugar, or nucleic acid base of a nucleotide may also be substituted for another phosphate or nucleic acid base. For example, a uridine base may be substituted for a pseudouridine base, in which the uracil base is attached to the sugar by a carbon-carbon bond rather than a nitrogen-carbon bond.

In some embodiments, the present disclosure may be used to determine the concentration of any ribonucleic acid polymer including any ribonucleic acid sequences that has been removed from its naturally occurring environment, any ribonucleic acid polymer that is a product of recombinant or cloned DNA isolates, and any ribonucleic acid polymer that results from using chemically synthesized analogues or analogues biologically synthesized by heterologous systems.

In some embodiments, the target RNA comprises a nucleotide analog. Nucleotide analogs are compounds that have the general structure of a nucleotide or are structurally similar to a nucleotide. Nucleotide analogs, for example, include an analog of the nucleobase, an analog of the sugar and/or an analog of the phosphate group(s) of a nucleotide.

In some embodiments, the target RNA comprises a nucleoside, a nucleoside analogue, or a combination thereof. A nucleoside includes a nitrogenous base and a 5-carbon ribose sugar. Thus, a nucleoside plus a phosphate group yields a nucleotide (e.g. NMP). Nucleoside analogs are compounds that have the general structure of a nucleoside or are structurally similar to a nucleoside. Nucleoside analogs, for example, include an analog of the nucleobase and/or an analog of the sugar of a nucleoside.

In some embodiments, the target RNA comprises a naturally occurring nucleotide, a synthetic nucleotide, a chemically modified nucleotide, or a combination thereof. Examples of naturally occurring nucleotides used for the production of RNA, e.g., in an in vitro transcription (IVT) reaction, as provided herein include adenosine triphosphate (ATP), guanosine triphosphate (GTP), cytidine triphosphate (CTP), uridine triphosphate (UTP), and 5-methyluridine triphosphate (m5UTP). In some embodiments, adenosine diphosphate (ADP), guanosine diphosphate (GDP), cytidine diphosphate (CDP), and/or uridine diphosphate (UDP) are used. Chemically modified nucleotides may include modified nucleobases. For example, an RNA transcript (e.g., mRNA transcript) of interest may include a modified nucleobase selected from pseudouridine (ψ), N1-methylpseudouridine (m1ψ), N1-ethylpseudouridine, 2-thiouridine, 4'-thiouridine, 2-thio-1-methyl-1-deaza-pseudouridine, 2-thio-1-methyl-pseudouridine, 2-thio-5-aza-uridine, 2-thio-dihydropseudouridine, 2-thio-dihydrouridine, 2-thio-pseudouridine, 4-methoxy-2-thio-pseudouridine, 4-methoxy-pseudouridine, 4-thio-1-methyl-pseudouridine, 4-thio-pseudouridine, 5-aza-uridine, dihydropseudouridine, 5-methyluridine, 5-methoxyuridine (mo5U) and 2'-O-methyl uridine. In some embodiments, an RNA transcript (e.g., mRNA transcript) includes a combination of at least two (e.g., 2, 3, 4 or more) of the foregoing modified nucleobases.

Some aspects relate to methods for quantifying the concentration of natural RNA (e.g. mRNA) in a solution. Here, the term "natural" refers to RNA structures formed from naturally occurring NMPs, for example adenosine monophosphate, guanosine monophosphate, cytidine monophosphate, and uridine monophosphate. Without wishing to be bound by theory, the standard method for determining the concentration of natural RNA in a sample involves measuring the amount of ultraviolet light absorbed by the aromatic bases of the constituent NMP moieties (referred to herein as the "intact UV RNA quantification method"). As described elsewhere herein, NMPs may contain purines (e.g. cytosine and uracil) and pyrimidines (adenine and guanine), both of which have peak absorbances at 260 nm; thus 260 nm is the standard wavelength for quantifying the concentration of RNA samples. Without wishing to be bound by theory, the absorbance may then be used to determine the concentration of RNA using Beer's Law, which may be represented mathematically using Equation 1:

$$A = e * b * c$$

where A is the absorbance at 260 nm (OD260), e is the molar extinction coefficient (in units of mL/microgram*cm), b is the pathlength (in units of cm), and c is the concentration (in units of microgram/mL). Rearrangement of Equation 1, yields the RNA concentration according to Equation 2:

$$\text{Concentration} = \frac{OD260}{e \cdot b}$$

The molar extinction coefficient commonly used for RNA is 0.025 mL/microgram*cm. Using Beer's Law, the extinction coefficient may be converted into a standard coefficient multiplier (units of microgram*cm/mL), according to Equation 3:

$$\text{Concentration} = \frac{OD260}{b} \times \text{Standard coefficient}$$

where the standard coefficient for RNA is equal to 40 microgram/mL (e.g. 1/0.025 mL/microgram*cm=40 microgram*cm/mL). In some embodiments, the initial RNA solution may need to be diluted prior to measuring the absorbance at 260 nm. Without wishing to be bound by theory, absorbance values greater than or equal to 1, indicate the RNA solution is too concentrated and require the sample to be diluted. The concentration of RNA may then be calculated according to Equation 4:

$$\text{Concentration} = \frac{OD260}{b} \times \text{Standard coefficient} \times \text{Dilution factor}$$

where, the term dilution factor refers to the ratio of the volume of the initial (or concentrated) RNA solution to the volume of the final (or dilute) RNA solution (e.g. final volume/initial volume).

Without wishing to be bound by theory, it is believed that the standard intact UV RNA quantification method may yield variable results for a given RNA sequence depending on RNA structure and sequence and the solution pH and salt concentration. For example, solutions with high salt concentrations may induce the RNA to adopt secondary structures (e.g. higher ordered aggregates or helical structures) that may decrease the absorbance measurement. Similarly, RNA sequences comprising chemically modified nucleotides may also affect with the absorbance measurement, by for example, increasing the absorbance at 260 nm or by decreasing the absorbance at 260 nm. Again, without wishing to be bound by theory, this may be because the standard coefficient used for the quantification of RNA concentration (e.g. 40 micrograms/mL) is an approximation that assumes the RNA is single stranded (e.g. no secondary structure) and comprises only naturally occurring nucleotides (e.g. AMP, CMP, GMP, and UMP). The presence of nucleotides with modified nucleobases, such as those selected from pseudouridine (ψ), N1-methylpseudouridine (m1ψ), N1-ethylpseudouridine, 2-thiouridine, 4'-thiouridine, 2-thio-1-methyl-1-deaza-pseudouridine, 2-thio-1-methyl-pseudouridine, 2-thio-5-aza-uridine, 2-thio-dihydropseudouridine, 2-thio-dihydrouridine, 2-thio-pseudouridine, 4-methoxy-2-thio-pseudouridine, 4-methoxy-pseudouridine, 4-thio-1-methyl-pseudouridine, 4-thio-pseudouridine, 5-aza-uridine, dihydropseudouridine, 5-methyluridine, 5-methoxyuridine (mo5U) and 2'-O-methyl uridine, may for example, alter the absorbance at 260 nm, rendering the measured RNA concentration artificially lower or artificially higher than the true RNA concentration. Without wishing to be bound by theory, the percent change from the true RNA concentration may increase for RNA transcripts comprising at least one or more (e.g. 1, 2, 3, 4, or more) of the foregoing modified nucleobases.

Some aspects relate to methods for quantifying the concentration of RNA, optionally comprising at least one chemically modified nucleotide, from a digested mixture. It has now been discovered that the absorbance at 260 nm is less susceptible to influence by RNA structure, pH or salt concentration, if the RNA polymer is first broken down into its constituent NMP building blocks. Therefore, in accordance with some embodiments, the target RNA (e.g. mRNA) may be degraded, e.g., using a base, to yield a digested RNA mixture comprising a plurality of nucleotide monophosphates (NMPs). Without wishing to be bound by theory, RNA polymers are composed of a plurality of ribonucleotides joined via 3',5'-phosphodiester linkages. The proximity of the adjacent 2'-hyroxyl group to the phosphorus center of each inter-nucleotide linkage permits facile transesterification to occur, particularly under strongly acidic or strongly basic conditions. Both acid-catalyzed and base-catalyzed reactions proceed via an SN2 mechanism wherein the 2' oxygen attacks the adjacent phosphorus center. In some embodiments, alkaline conditions favor specific base catalysis, in which the 2'-hydroxyl group is deprotonated by hydroxide to generate the more nucleophilic 2'-oxyanion group. In this process, the P-5'O bond of the phosphodiester linkage is cleaved upon formation of a new P-2'O bond to yield 2',3'-cyclic phosphate and 5'-hydroxyl termini. This cyclizing mechanism for RNA cleavage is the primary pathway for the uncatalyzed degradation of RNA under typical cellular conditions. In another embodiment, the cyclic product may undergo subsequent hydrolysis to yield a mixture of 2'-phosphate and 3'-phosphate NMP products.

A digested RNA mixture, as used herein, is a solution comprising a plurality of nucleotide monophosphates. In some embodiments the entire RNA is digested into nucleotide monophosphates. In some embodiments the digested RNA mixture comprises at least 70%, 75%, 80%, 85%, 90%, 95%, 96%, 97%, 98%, 99%, 99.5%, 99.6%, 99.7%, 99.8%, 99.9% or 100% nucleotide monophosphates. In some embodiments the digested RNA mixture comprises an adenosine monophosphate, a cytidine monophosphate, a guanosine monophosphate, a uridine monophosphate, a N1-methyl-pseudouridine, a 5-methoxy-uridine, and/or a N1-ethyl-pseudouridine.

In some embodiments the digested RNA mixture comprises a 2' or 3' adenosine monophosphate having a mass corrected coefficient of about 14 to 34 micrograms*cm/mL, such as about 14 micrograms*cm/mL, about 15 micrograms*cm/mL, about 16 micrograms*cm/mL, about 17 micrograms*cm/mL, about 18 micrograms*cm/mL, about 19 micrograms*cm/mL, about 20 micrograms*cm/mL, about 21 micrograms*cm/mL, about 22 micrograms*cm/mL, about 23 micrograms*cm/mL, about 24 micrograms*cm/mL, about 25 micrograms*cm/mL, about 26 micrograms*cm/mL, about 27 micrograms*cm/ mL, about 28 micrograms*cm/mL, about 29 micrograms*cm/mL, about 30 micrograms*cm/mL, about 31 micrograms*cm/mL, about 32 micrograms*cm/mL, about 33 micrograms*cm/mL, and about 34 micrograms*cm/mL.

In some embodiments, the digested RNA mixture comprises a 2' or 3' cytidine monophosphate having a mass corrected coefficient of about 34 to 54 micrograms*cm/mL, such as about 34 micrograms*cm/mL, about 35 micrograms*cm/mL, about 36 micrograms*cm/mL, about 37 micrograms*cm/mL, about 38 micrograms*cm/mL, about 39 micrograms*cm/mL, about 40 micrograms*cm/mL, about 41 micrograms*cm/mL, about 42 micrograms*cm/mL, about 43 micrograms*cm/mL, about 44 micrograms*cm/mL, about 45 micrograms*cm/mL, about 46 micrograms*cm/mL, about 47 micrograms*cm/mL, about 48 micrograms*cm/mL, about 49 micrograms*cm/mL, about 50 micrograms*cm/mL, about 51 micrograms*cm/mL, about 52 micrograms*cm/mL, about 53 micrograms*cm/mL, and about 54 micrograms*cm/mL.

In some embodiments, the digested RNA mixture comprises a 2' or 3' guanosine monophosphate having a mass corrected coefficient of about 19 to 39 micrograms*cm/mL, such as about 19 micrograms*cm/mL, about 20 micrograms*cm/mL, about 21 micrograms*cm/mL, about 22 micrograms*cm/mL, about 23 micrograms*cm/mL, about 24 micrograms*cm/mL, about 25 micrograms*cm/mL, about 26 micrograms*cm/mL, about 27 micrograms*cm/mL, about 28 micrograms*cm/mL, about 29 micrograms*cm/mL, about 30 micrograms*cm/mL, about 31 micrograms*cm/mL, about 32 micrograms*cm/mL, about 33 micrograms*cm/mL, about 34 micrograms*cm/mL, about 35 micrograms*cm/mL, about 36 micrograms*cm/mL, about 37 micrograms*cm/mL, about 38 micrograms*cm/mL and about 39 micrograms*cm/mL.

In some embodiments, the digested RNA mixture comprises a 2' or 3' uridine monophosphate having a mass corrected coefficient of about 32 to 52 micrograms*cm/mL, such as about 32 micrograms*cm/mL, about 33 micrograms*cm/mL, about 34 micrograms*cm/mL, about 35 micrograms*cm/mL, about 36 micrograms*cm/mL, about 37 micrograms*cm/mL, about 38 micrograms*cm/mL, about 39 micrograms*cm/mL, about 40 micrograms*cm/mL, about 41 micrograms*cm/mL, about 42 micrograms*cm/mL, about 43 micrograms*cm/mL, about 44 micrograms*cm/mL, about 45 micrograms*cm/mL, about 46 micrograms*cm/mL, about 47 micrograms*cm/mL, about 48 micrograms*cm/mL, about 49 micrograms*cm/mL, about 50 micrograms*cm/mL, about 51 micrograms*cm/mL and about 52 micrograms*cm/mL.

In some embodiments, the digested RNA mixture comprises a 2' or 3' N1-methyl-pseudouridine having a mass corrected coefficient of about 54 to 75 micrograms*cm/mL, such as about 54 micrograms*cm/mL, about 55 micrograms*cm/mL, about 56 micrograms*cm/mL, about 57 micrograms*cm/mL, about 58 micrograms*cm/mL, about 59 micrograms*cm/mL, about 60 micrograms*cm/mL, about 61 micrograms*cm/mL, about 62 micrograms*cm/mL, about 63 micrograms*cm/mL, about 64 micrograms*cm/mL, about 65 micrograms*cm/mL, about 66 micrograms*cm/mL, about 67 micrograms*cm/mL, about 68 micrograms*cm/mL, about 69 micrograms*cm/mL, about 70 micrograms*cm/mL, about 71 micrograms*cm/mL, about 72 micrograms*cm/mL, about 73 micrograms*cm/mL, about 74 micrograms*cm/mL and about 75 micrograms*cm/mL.

In some embodiments, the digested RNA mixture comprises a 5-methoxy-uridine having a mass corrected coefficient of about 82 to 103 micrograms*cm/mL, such as about 82 micrograms*cm/mL, about 83 micrograms*cm/mL, about 84 micrograms*cm/mL, about 85 micrograms*cm/mL, about 86 micrograms*cm/mL, about 87 micrograms*cm/mL, about 88 micrograms*cm/mL, about 89 micrograms*cm/mL, about 90 micrograms*cm/mL, about 91 micrograms*cm/mL, about 92 micrograms*cm/mL, about 93 micrograms*cm/mL, about 94 micrograms*cm/mL, about 95 micrograms*cm/mL, about 96 micrograms*cm/mL, about 97 micrograms*cm/mL, about 98 micrograms*cm/mL, about 99 micrograms*cm/mL, about 100 micrograms*cm/mL, about 101 micrograms*cm/mL, about 102 micrograms*cm/mL and about 103 micrograms*cm/mL.

In some embodiments, the digested RNA mixture comprises a N1-ethyl-pseudouridine having a mass corrected coefficient of about 53 to 74 micrograms*cm/mL about, such as about 53 micrograms*cm/mL, about 54 micrograms*cm/mL, about 55 micrograms*cm/mL, about 56 micrograms*cm/mL, about 57 micrograms*cm/mL, about 58 micrograms*cm/mL, about 59 micrograms*cm/mL, about 60 micrograms*cm/mL, about 61 micrograms*cm/mL, about 62 micrograms*cm/mL, about 63 micrograms*cm/mL, about 64 micrograms*cm/mL, about 65 micrograms*cm/mL, about 66 micrograms*cm/mL, about 67 micrograms*cm/mL, about 68 micrograms*cm/mL, about 69 micrograms*cm/mL, about 70 micrograms*cm/mL, about 71 micrograms*cm/mL, about 72 micrograms*cm/mL, about 73 micrograms*cm/mL and about 74 micrograms*cm/mL.

In some embodiments, the target RNA may be degraded, using a base to yield a digested RNA mixture comprising nucleotide monophosphates (NMPs). In some embodiments, the base comprises sodium hydroxide (e.g. NaOH), potassium hydroxide (e.g. KOH), caesium hydroxide, strontium hydroxide, calcium hydroxide, lithium hydroxide, rubidium hydroxide or a combination thereof. In some embodiments, the base is sodium hydroxide. In some embodiments, the base is potassium hydroxide. In some embodiments, the final concentration of the base in the digestion mixture comprises 0.2M, 0.3M, 0.4M, 0.5M, 0.6M, 0.7M, 0.8M, 0.9M, 1M, 1.2M, 1.3M, 1.4M, 1.5M, or 2M base or more. In some embodiments, the final concentration of the base in the digestion mixture is about 0.8M.

In some embodiments, a digested RNA mixture may be prepared by adding a base to a solution of RNA and incubating the mixture to digest the RNA into nucleotide monophosphates. In some embodiments, the digestion mixture may be heated to at least 30 C, at least 35 C, at least 37 C, at least 40 C, at least 45 C, at least 50 C, at least 60 C, at least 65 C, at least 70 C, at least 75 C, at least 80 C, at least 85 C, at least 90 C, at least 95 C, or any combination thereof or range therebetween. In some embodiments, the digestion mixture is heated to 65 C. In some embodiments, the digestion mixture may be heated using an Eppendorf Mastercycler.

In some embodiments, a digested RNA mixture may be prepared by adding a base to a solution of RNA and incubating the mixture to digest the RNA into nucleotide monophosphates. In some embodiment, the digestion mixture is heated (e.g., at 37 C) for at least 5 min, at least 10 min, at least 15 min, at least 20 min, at least 30 min, at least 35 min, at least 40 min, at least 45 min, at least 50 min, at least 55 min, at least 1 hour, at least 1.5 hours, at least 2 hours, at least 2.125 hours, at least 2.5 hours, at least 3 hours, at least 3 hours, at least 3.5 hours, at least 4 hours, at least 5 hours, at least 6 hours, at least 7 hours, at least 8 hours, at least 9 hours, or at least 10 hours. In some embodiments, the digestion mixture is heated to at least 65 C for at least 30 min, for at least 2-2.5 hours, and for at least 4 hours. In some embodiments, the digestion mixture is heated to at least 95 C for at least 30 min, for at least 2-2.5 hours, or for at least 4 hours. In some embodiments, the digestion mixture is heated to between 60 C-70 C for at least 30 min, for at least 2-2.5 hours, or for at least 4 hours. In some embodiments, the digestion mixture is heated to between 60 C-70 C for at least 30 min. In some embodiments, the digestion reaction may be run using an Eppendorf Mastercycler.

In some embodiments, the RNA digestion mixture may be quenched using an acid, e.g., a strong acid such as hydrochloric acid (e.g. HCl). Non-limiting examples of acids that may be used include nitric acid (HNO3), sulfuric acid (H2SO4), hydrobromic acid (HBR), hydroiodic acid (HI), chloric acid (HClO3), and perchloric acid (HClO4). In some embodiments, the final concentration of the acid in the digestion mixture comprises 0.2M, 0.3M, 0.4M, 0.5M, 0.6M, 0.7M, 0.8M, 0.9M, 1M, 1.2M, 1.3M, 1.4M, 1.5M, or 2M acid or more. In some embodiments, the final concentration of the acid in the digestion mixture is about 0.8M. In some embodiments, the final concentration of strong acid is the same as the concentration of strong base used to digest the RNA.

In some embodiments, the RNA digestion mixture may be diluted using an aqueous buffer. In some embodiments, the buffer comprises RNase-free water. Exemplary buffers include TE, TAE, TBE, sodium citrate, MES, cacodylate, PIPES, MOPS, TES, HEPES, TAPSO, Tricine, Tris, Bicine, TAPS, phosphate buffered saline, sodium acetate, citric acid-sodium citrate, citric acid-Na2HPO4, sodium acetate-acetic acid, and sodium carbonate-sodium bicarbonate. In some embodiments, the pH range of said buffers is between 6.0 and 7.0. In some embodiments, the pH of the buffer is 6.5. In some embodiments, the concentration of the buffer is between 1 mM and 1 M. In some embodiments, the concentration of the buffer is 2 mM. In some embodiments, the final dilution factor is at least 2, is at least 4, is at least 6, is at least 8, is at least 10, is at least 20, is at least 30, is at least 40, is at least 50 is at least 60, is at least 70, is at least 80, is at least 90, is at least 100, is at least 110, is at least 120, is at least 130, is at least 140, is at least 150, is at least 160, is at least 170, is at least 180, is at least 190, is at least 200, or any range thereinbetween. In some embodiments, the final dilution factor is 75. Here, the term "dilution factor" refers to the ratio of the volume of the initial (i.e. prior to the digestion) RNA solution to the volume of the final (i.e. after the digestion and addition of neutralizing acid and buffer) RNA solution (e.g. final volume/initial volume). As a non-limiting example, mixing 2 microliters of a target RNA with 300 microliters of reagents (e.g. base, acid, and buffer), would result in a dilution factor of 150 (e.g. 300 microliters/2 microliters).

In some embodiments, the absorbance at 260 nm of the digested RNA mixture may be measured using a spectrophotometer. Non-limiting examples of the types of spectrophotometers that may be used to measure the absorbance at 260 nm include the Nanodrop 2000 spectrophotometer, the BioTek Synergy spectrophotometer, the FLUOstar OMEGA spectrophotometer, and the like.

In some embodiments, the mRNA solution is not degraded using a base, such that the mRNA solution comprises a plurality of nucleotides comprising intact RNA polymers.

Certain aspects of the present disclosure relate to methods for calculating a sequence corrected coefficient (SCC). As described elsewhere herein, the RNA concentration may be calculated using a modified version of Beer's law. In some embodiments, a sequence corrected coefficient (SCC) is used in place of the standard coefficient employed in the standard intact UV RNA quantification method, according to Equation 5:

Concentration=OD260×SCC×Dilution Factor where the SCC is determined according to Equation 6:

$$SCC = \frac{1}{\sum \frac{\%NMP}{MCC_{NMP}}}$$

Without wishing to be bound by theory, the sequence corrected coefficient (SCC) accounts for (1) the relative percent of each NMP in the target RNA sequence and (2) the contribution of each NMPs extinction coefficient (represented by the MCC term in the SCC equation) to the absorbance measurement. This is in contrast to the standard coefficient shown in Equation 4, which is an approximate extinction coefficient for all single standard RNAs, and is thus more prone to result in RNA concentrations that are either lower or higher than the true RNA concentration.

In some embodiments, the SCC may be derived by assuming a simplified 1 mole of RNA containing the nucleotides AMP, CMP, GMP, and UMP (although it should be understood that this derivation is for demonstration purposes only and that any nucleotide, including any chemically modified nucleotide, may also be used with this method), according to Equation 7:

a moles of AMP+b moles of CMP+c moles of GMP+d moles of UMP

The molecular weight of the RNA, $MW_{RNA}$ may be calculated by multiplying the moles of NMP by the molecular weight of the NMP, according to Equation 8:

$MW_{RNA}=a \cdot MW_{AMP}+b \cdot MW_{CMP}+c \cdot MW_{GMP}+d \cdot MW_{UMP}$

The molar extinction coefficient, e, of the digested RNA may be represented according to Equation 9:

$e_{RNA}=a \cdot e_{AMP}+b \cdot e_{CMP}+c \cdot e_{GMP}+d \cdot e_{UMP}$

The molar extinction coefficient of the intact RNA, $e_{RNA}$, is related to the SCC according to Equation 10:

$$e_{RNA} = \frac{MW_{RNA}}{SSC}$$

The molar extinction coefficient of each digested NMP, $e_{NMP}$, is related to a mass corrected coefficient for each NMP, $MCC_{NMP}$, according to Equations 11-14:

$$e_{AMP} = \frac{MW_{AMP}}{MCC_{AMP}}$$

$$e_{CMP} = \frac{MW_{CMP}}{MCC_{CMP}}$$

$$e_{GMP} = \frac{MW_{GMP}}{MCC_{GMP}}$$

$$e_{UMP} = \frac{MW_{UMP}}{MCC_{UMP}}$$

The MCC is equal to the inverse of the molar extinction coefficient (1/e) and is analogous to the standard coefficient in Equation 4; however, unlike the standard coefficient, the MCC is unique and specific to each NMP of interest. In some embodiments, the MCC for each NMP of interest is experimentally determined as described in detail in Example 13. Substituting Equations 10 and 11-14 into Equation 9 yields Equation 15:

$$\frac{MW_{RNA}}{SCC} = a \cdot \frac{MW_{AMP}}{MCC_{AMP}} + b \cdot \frac{MW_{CMP}}{MCC_{CMP}} + c \cdot \frac{MW_{GMP}}{MCC_{GMP}} + d \cdot \frac{MW_{UMP}}{MCC_{UMP}}$$

Dividing both sides of the equation by MW(RNA) yields Equation 16:

$$\frac{1}{SCC} = \left[a \cdot \frac{MW_{AMP}}{MCC_{AMP}} \cdot MW_{RNA}\right] + \left[b \cdot \frac{MW_{CMP}}{MCC_{CMP}} \cdot MW_{RNA}\right] + \left[c \cdot \frac{MW_{GMP}}{MCC_{GMP}} \cdot MW_{RNA}\right] + \left[d \cdot \frac{MW_{UMP}}{MCC_{UMP}} \cdot MW_{RNA}\right]$$

Noting that by definition:

$$a \cdot \frac{MW_{AMP}}{MW_{RNA}} = \%AMP$$

$$b \cdot \frac{MW_{CMP}}{MW_{RNA}} = \%CMP$$

$$c \cdot \frac{MW_{GMP}}{MW_{RNA}} = \%GMP$$

$$d \cdot \frac{MW_{GMP}}{MW_{RNA}} = \%UMP$$

Equation 16 may then be re-written as Equation 17:

$$\frac{1}{SCC} = \frac{\%AMP}{MCC_{AMP}} + \frac{\%CMP}{MCC_{CMP}} + \frac{\%GMP}{MCC_{GMP}} + \frac{\%UMP}{MCC_{UMP}}$$

Taking the inverse of both sides of Equation 17 yields Equation 18:

$$SCC = \frac{1}{\frac{\%AMP}{MCC_{AMP}} + \frac{\%CMP}{MCC_{CMP}} + \frac{\%GMP}{MCC_{GMP}} + \frac{\%UMP}{MCC_{UMP}}}$$

Therefore, in accordance with some embodiments, the SCC may be generalized according to Equation 18, as the inverse of the sum of the quotient of the relative percent of NMP and its corresponding MCC value.

$$SCC = \frac{1}{\sum \frac{\%NMP}{MCC(NMP)}}$$

Plugging Equation 6 into Equation 5, provides the revised equation for calculating the concentration of RNA from a digested sample, for any pathlength (Equation 19):

$$\text{Concentration}(RNA) = \frac{OD260}{\text{pathlength}} * \frac{1}{\sum \frac{\%NMP}{MCC(NMP)}} * \text{Dilution Factor}$$

As described elsewhere herein, certain aspects of the present disclosure relate to methods for calculating the mass corrected coefficient (MCC). In some embodiments, calculating the SCC for an RNA (e.g. mRNA) may require the MCCs for all NMPs within the target RNA sequence to be experimentally determined, including any chemically modified NMPs. As a non-limiting example, the process for determining the MCC for adenosine monophosphate is shown in Example 13.

In some embodiments, the SCC term in Equation 5 may be approximated using Beer's law for mixtures. Based on Beer's law, it may be assumed that the absorbance of a mixture comprising a digested RNA polymer (e.g. mRNA) is equal to that of the individual NMPs in the digested solution, weighted by their relative abundance in the solution (i.e. relative percent of the NMP in the RNA sequence). Therefore, in accordance with some embodiments, the SCC may, alternatively, be calculated using Equation 20:

SCC=(% NMP–MCC$_{NMP}$)

substituting Equation 20 into Equation 5, yields Equation 21:

$$\text{Concentration}(RNA) = \frac{OD260}{\text{pathlength}} * \sum(\%NMP \cdot MCC_{NMP}) * \text{Dilution Factor}$$

As will be appreciated by those skilled in the art, the measured SCC value may be within a range, e.g. +/−10%, due to lot-to-lot variation of the NMP itself and changes in buffer conditions, e.g., pH, ionic strength, etc. In some embodiments repeated SCC calculations are within 5%, within 10%, within 15%, within 20%, within 25%, within 30%, within 35%, etc., of each other.

In some embodiments, the method comprises a technique for determining the concentration of an intact RNA polymer (i.e. not digested with a base) using the sequence corrected coefficient. It has been discovered that AEX-HPLC can be used to generate calibration curves of NaOH digested mRNAs of a specific lot, which can then be used to quantify a second lot of the same, but intact, mRNA construct (i.e. eliminates the need to do multiple NaOH digestions for a single mRNA construct).

Figure 5:
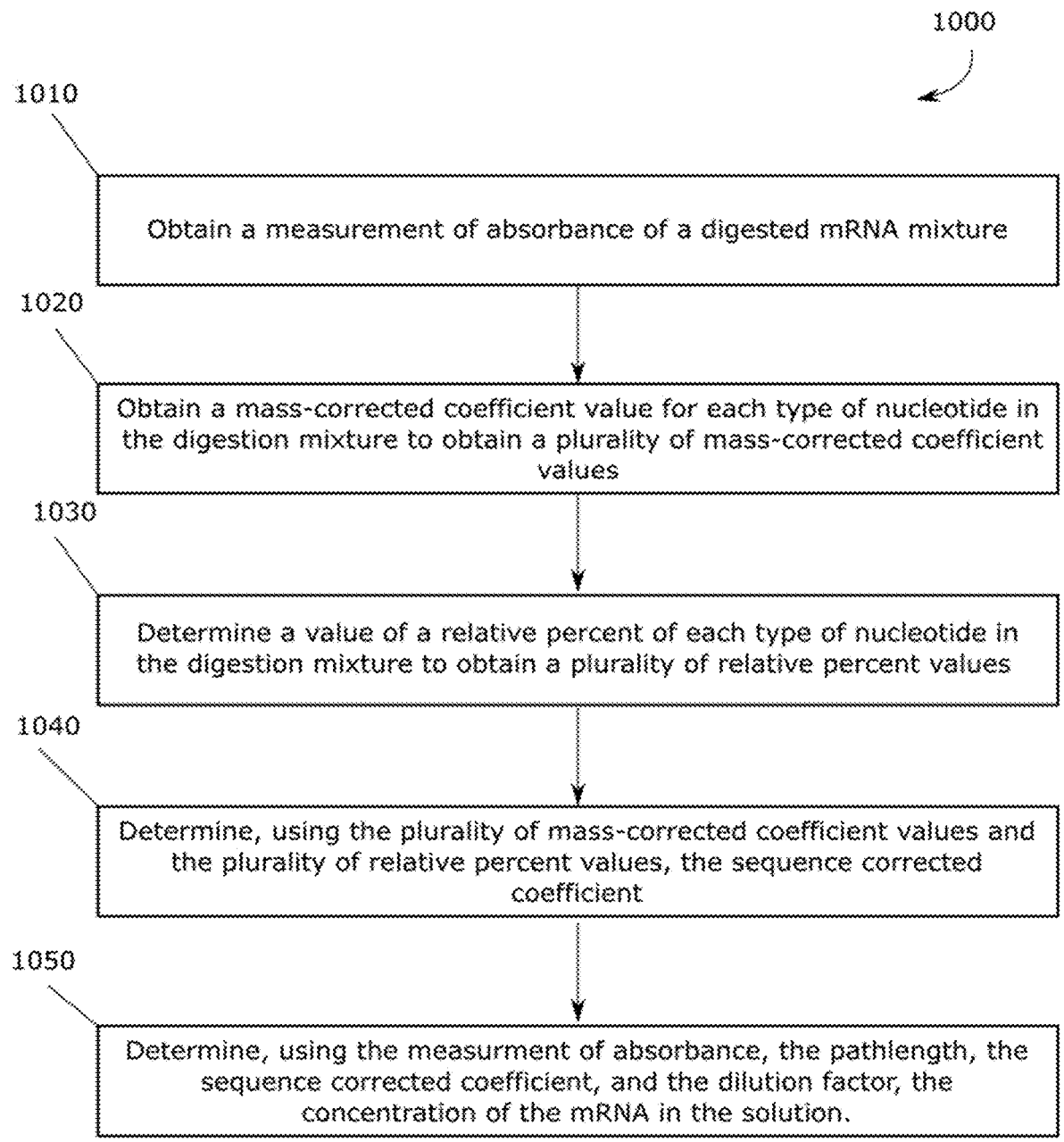
FIG. 5 illustrates a method for determining the concentration of RNA in solution using a computer-implemented technique; according to some embodiments.

Some aspects relate to determining the concentration of RNA in a solution using computer-implemented techniques. FIG. 5 is a diagram of an illustrative technique 1000 for determining the concentration of RNA in a solution, according to some embodiments. In some embodiments, the technique includes: (1) obtaining a measurement of absorbance of a digested mRNA mixture 1010, the digested mRNA mixture prepared by adding a base to a solution of mRNA and incubating the mixture to digest the mRNA into nucleotide monophosphates. Any ultraviolet-visible spectrophotometer may be used to perform the analysis, such as, for example, the Nanodrop 2000, BioTeck Synergy, and the FLUOstar OMEGA spectrophotometers, among others; (2) obtaining a mass-corrected coefficient value for each type of nucleotide in the digestion mixture to obtain a plurality of mass-corrected coefficient values 1020; (3) determining a value of a relative percent of each type of nucleotide in the digestion mixture to obtain a plurality of relative percent values 1030; (4) determining, using the plurality of mass-corrected coefficient values and the plurality of relative percent values, the sequence corrected coefficient 1040; and (5) determining, using the measurement of the absorbance, the pathlength, the sequence corrected coefficient, and the dilution factor, the concentration of the mRNA in the solution 1050.

Figure 6:
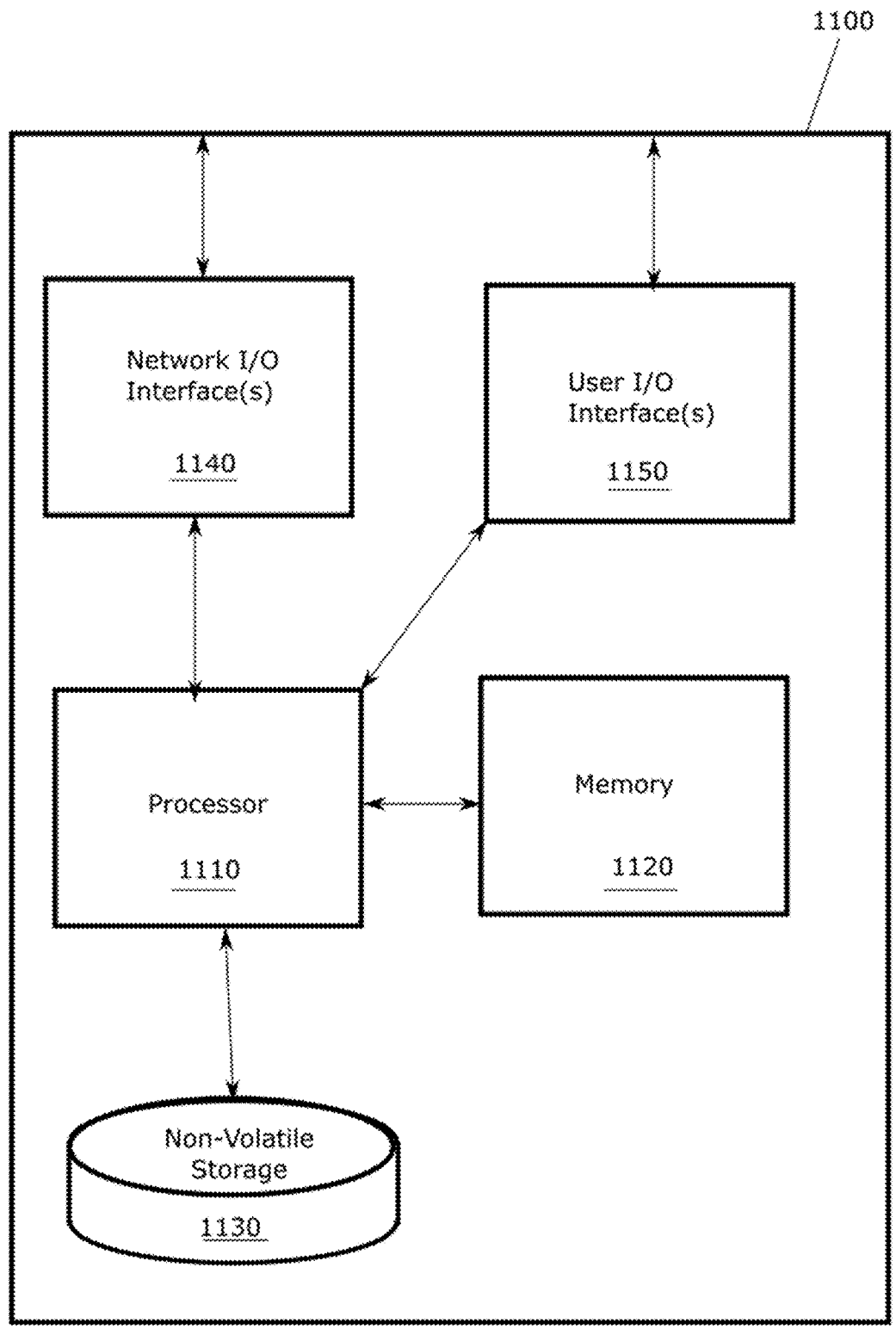
FIG. 6 is an illustrative implementation of a computer system that may be used to determine the concentration of RNA in a solution, in some embodiments.

An illustrative implementation of a computer system 1100 that may be used in connection with any of the embodiments of the technology described herein (e.g. such as the method of FIG. 5) is shown in FIG. 6. The computer system 1100 includes one or more computer hardware processors 1110 and one or more articles of manufacture that comprise non-transitory computer-readable storage media (e.g. memory 1120 and one or more non-volatile storage media 1130). The process 1110 may control writing data to and reading date from the memory 1120 and the non-volatile storage device 1130 in any suitable manner, as the aspects of the technology described herein are limited in this respect. To perform any of the functionality described herein, the processor(s) 1110 may execute one or more processor-executable instruction stored in one or more non-transitory computer-readable storage media (e.g. the memory 1120), which may serve as non-transitory computer-readable storing processor-executable instructions for execution by the processor 1110.

Computing device 1100 may also include a network input/output (I/O) interface 1140 via which the computing device may communicate with other computing devices (e.g. over a network), and may also include one or more user I/O interfaces 1150, via which the computing device may provide output to and receive input from a user. The user I/O interfaces may include devices such as a keyboard, a mouse, a microphone, a display device (e.g. a monitor or touch screen), speakers, a camera, and/or various other types of I/O devices.

The above-described embodiments may be implemented in any of numerous ways. For example, the embodiments may be implemented using hardware, software or a combination thereof. When implemented in software, the software code can be executed on any suitable computer hardware processor (e.g., one or more microprocessors, one or more graphic processing units (GPUs)) or collection of computer hardware processors, whether provided in a single computing device or distributed among multiple computing devices. Additionally, or alternatively, the embodiments may be implemented using one or more application specific integrated circuits (ASICs), and/or one or more field programmable gate arrays (FPGAs). As such, embodiments may be implemented using any suitable computing device (e.g., one or more computer hardware processors, one or more ASICs, and/or one or more FPGAs).

In this respect, it should be appreciated that one implementation of the embodiments described herein comprises at least one non-transitory computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (e.g., a plurality of executable instructions) that, when executed on one or more computer hardware processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The foregoing description of implementations provides illustration and description but is not intended to be exhaustive or to limit the implementations to the precise form disclosed. Modifications and variations are possible in light of the above teachings or may be acquired from practice of the implementations. In other implementations the methods depicted in these figures may include fewer operations, different operations, differently ordered operations, and/or additional operations. Further, non-dependent blocks may be performed in parallel.

The terms "program" or "software" are used herein in a generic sense to refer to any type of computer code or set of computer-executable instructions that can be employed to program a computer or other processor to implement various aspects as described above. Additionally, it should be appreciated that according to some aspects, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone, a tablet, or any other suitable portable or fixed electronic device.

The following examples are intended to illustrate certain embodiments of the present disclosure, but do not exemplify the full scope of the disclosure.

EXAMPLES

Example 1: Quantification of mRNA Using the Standard Intact UV mRNA Quantification Method The concentration of intact mRNA was determined using UV absorbance at 260 nm (referred to the optical density at 260, OD260) and compared to a gravimetric standard. mRNA-1, mRNA-2, mRNA-3, and mRNA-4 were prepared at two different concentrations, the OD260 measured, and the final mRNA concentration determined. The OD260 measurements were conducted using three different spectrophotometers: Nanodrop 2000, BioTeck Synergy, and the FLUOstar OMEGA spectrophotometers. The calculated mRNA concentrations (micrograms/mL) represent an average of two experimental replicates obtained from three technical replicates, respectively (Table 1). The mRNA was calculated using the standard intact UV mRNA quantification method, which includes measuring the absorbance value at 260 nm and applying the literature accepted mass-corrected extinction coefficient of 40 microgram/mL for single stranded RNA (ssRNA).

The results showed that the mRNA concentrations quantified using the FLUOstar OMEGA plate reader and the Nanodrop were in good agreement with each other; whereas concentrations obtained using the Synergy were consistently higher than both the FLUOstar OMEGA and the Nanodrop. In addition, concentrations of mRNAs 1-3 were approximately 10-30% lower than the gravimetric standard, regardless of the spectrophotometer used.

Calibration curves were created for mRNA-3 and mRNA-4 by measuring the OD260, using the FLUOStar OMEGA plate reader, as a function of their concentration (0.0-0.05 mg/mL). These calibration curves where then used to determine the final concentration of mRNA-3 and mRNA-4 samples using the OD260 values for the gravimetric standards (also measured on the FLUOStar OMEGA plate reader). Implementation of calibrations curves increased the calculated mRNA concentration from about 5-13% (Table 2, FIG. 1).

TABLE 1

Intact mRNA concentrations of gravimetric standards across three different instruments.

| Gravimetric Standard | Hamilton (microgram/mL) | NanoDrop (microgram/mL) | Synergy (microgram/mL) |
|---|---|---|---|
| mRNA-1 (1.78 mg/mL) | 1286 | 1299 | 1532 |
| mRNA-2 (1.61 mg/mL) | 1303 | 1227 | 1428 |
| mRNA-3 (1.61 mg/mL) | 1793 | 1732 | 1979 |
| mRNA-4 (2.78 mg/mL) | 2830 | 3898 | 3035 |
| mRNA-1 (2.92 mg/mL) | 577 | 578 | 639 |
| mRNA-2 (0.77 mg/mL) | 643 | 616 | 676 |
| mRNA-3 (0.75 mg/mL) | 496 | 502 | 538 |
| mRNA-4 (0.79 mg/mL) | 765 | 788 | 838 |

TABLE 2

Figure 1B:
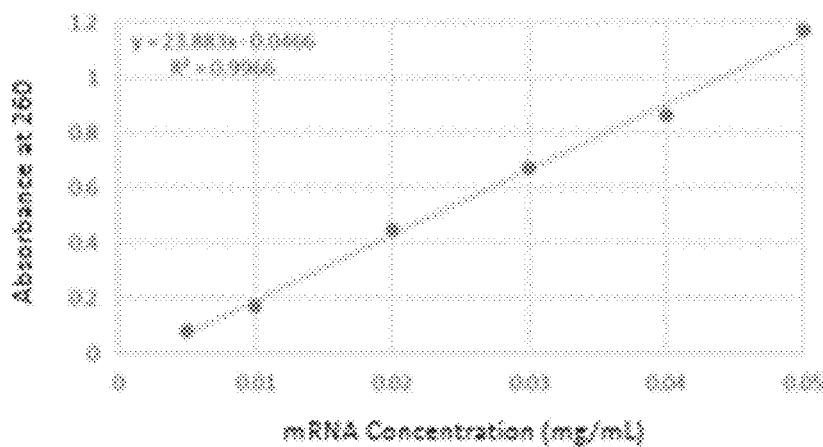
FIG. 1B illustrates a linear regression analysis performed on a plot of the absorbance at 260 nm as a function of mRNA-4 concentration, in some embodiments.

Intact mRNA concentrations of gravimetric standards measured on the FLUOStar OMEGA plate reader using the standard preclinical QC method, as well as the corrected values determined using the standard calibrations curves obtained in FIG. 1.

| Gravimetric Standard | Hamilton (microgram/mL) | Standard Curve Correction (microgram/mL) |
|---|---|---|
| mRNA-1 (1.78 mg/mL) | 1286 | — |
| mRNA-2 (1.61 mg/mL) | 1303 | — |
| mRNA-3 (1.61 mg/mL) | 1793 | 2610 |
| mRNA-4 (2.78 mg/mL) | 2830 | 3070 |
| mRNA-1 (2.92 mg/mL) | 577 | — |
| mRNA-2 (0.77 mg/mL) | 643 | — |
| mRNA-3 (0.75 mg/mL) | 496 | 827 |
| mRNA-4 (0.79 mg/mL) | 765 | 893 |

Example 2: Impact of NaCl Concentration on mRNA Quantification

Solution pH and salt concentrations may interfere with the OD260 of intact mRNA, thus skewing the calculated mRNA concentrations. In general, an increase in salt concentration decreases the OD260, and therefore, leads to a decrease in measured mRNA concentration. To better understand the impact salt has on existing mRNA quantification techniques, a NaCl titration study was performed using gravimetric standards of mRNA-2, mRNA-5, mRNA-6, and mRNA-7. An RNA nucleotide monophosphate (rNMP mix-1) was also included as a control to determine if a digested mRNA mixture would also be impacted by salt concentration.

Figure 2A:
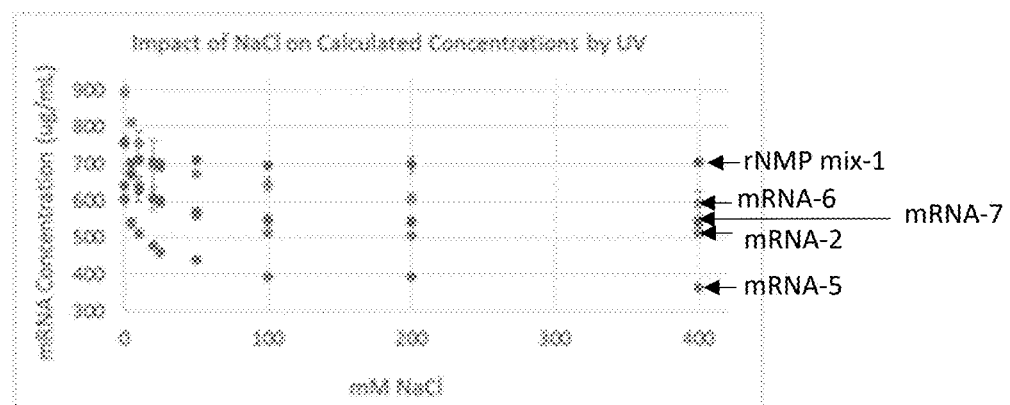
FIG. 2A illustrates a plot of the calculated mRNA concentration as a function of NaCl concentration, determined using the standard intact UV mRNA quantification method. mRNAs on plot include mRNA-2, mRNA-5, mRNA-6, mRNA-7. An rNMP mix was included as a control, in some embodiments.
Figure 2B:
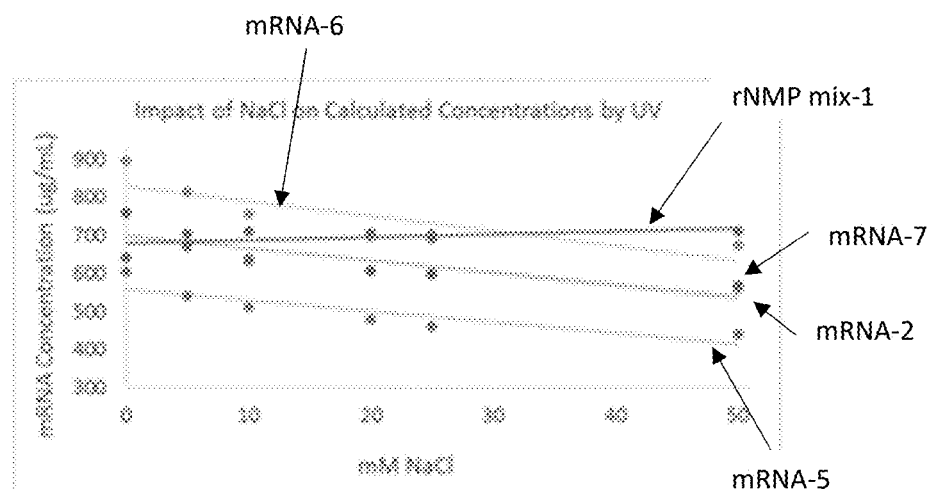
FIG. 2B illustrates a subplot of FIG. 2A in which the NaCl concentration of interest has been limited to 50 mM. This plot demonstrates that the rNMP absorbance at 260 nm is independent of salt concentration, in some embodiments.

As demonstrated in Table 3, increasing the amount of NaCl resulted in a decrease in mRNA concentration for all intact mRNA constructs. To demonstrate the magnitude of change in mRNA concentration, the percent change relative to 0 mM NaCl is shown in Table 4. As is evident in the Table, the mRNA concentration began decreasing with as little as 5 mM NaCl (~10%, Table 4, FIG. 2) and reached a maximum plateau at approximately 100 mM of NaCl (~30%, Table 4, FIG. 2). Importantly, and rather unexpectedly, the addition of NaCl did not have an effect on the rNMP concentration up to a final NaCl concentration of 400 mM.

TABLE 3

Relationship of Increasing NaCl Concentration with Decreasing mRNA Quant Values for Different mRNA Constructs.

| mM NaCl in Water | mRNA-2 (microgram/mL) | mRNA-5 (microgram/mL) | mRNA-6 (microgram/mL) | mRNA-7 (microgram/mL) | rNMP mix-1 (microgram/mL) |
|---|---|---|---|---|---|
| 0 mM | 761 ± 17 | 606 ± 11 | 897 ± 15 | 759 ± 11 | 643 ± 58 |
| 5 mM | 669 ± 04 | 541 ± 14 | 814 ± 08 | 676 ± 03 | 703 ± 10 |
| 10 mM | 641 ± 22 | 511 ± 10 | 756 ± 33 | 633 ± 36 | 711 ± 13 |
| 20 mM | 605 ± 04 | 479 ± 04 | 697 ± 67 | 607 ± 32 | 707 ± 09 |
| 25 mM | 596 ± 12 | 461 ± 08 | 704 ± 05 | 601 ± 13 | 693 ± 06 |
| 50 mM | 561 ± 11 | 441 ± 06 | 675 ± 03 | 570 ± 10 | 711 ± 04 |
| 100 mM | 514 ± 02 | 395 ± 08 | 645 ± 19 | 547 ± 15 | 696 ± 07 |
| 200 mM | 507 ± 06 | 394 ± 07 | 606 ± 14 | 543 ± 13 | 699 ± 23 |
| 400 mM | 513 ± 12 | 364 ± 07 | 594 ± 33 | 543 ± 12 | 705 ± 11 |

TABLE 4

The Percent Change in mRNA Quantification Observed as a Result of Increasing NaCl Concentration.

| mM NaCl in Water | mRNA-2 (Δ%) | mRNA-5 (Δ%) | mRNA-6 (Δ%) | mRNA-7 (Δ%) | rNMP mix-1 (Δ%) |
|---|---|---|---|---|---|
| 0 mM | — | — | — | — | — |
| 5 mM | −12 | −11 | −9 | −11 | 9 |
| 10 mM | −16 | −16 | −16 | −17 | 11 |
| 20 mM | −20 | −21 | −22 | −20 | 10 |
| 25 mM | −22 | −24 | −22 | −21 | 8 |
| 50 mM | −26 | −27 | −25 | −25 | 11 |
| 100 mM | −32 | −35 | −28 | −28 | 8 |
| 200 mM | −33 | −35 | −32 | −28 | 9 |
| 400 mM | −33 | −40 | −34 | −28 | 10 |

Example 3. Base Catalyzed Degradation of mRNA into NMPs

Based on the discovery that rNMP concentration was not affected up to a NaCl concentration of 400 mM, a series of experiments were conducted to determine if mRNA could be broken down into its constituent NMP building blocks using a non-specific base catalyzed digestion. Briefly, intact mRNA samples of mRNA-1, mRNA-2, mRNA-3, and mRNA-4 were prepared in water, and their concentrations determined using gravimetric analysis. Sodium hydroxide was added to these solutions. The reaction was quenched by addition of an equivalent volume of hydrochloric acid. No digest controls, in which the mRNA concentration was determined using standard intact techniques, were included for comparison.

All UV measurements were performed using the Nano-Drop 2000. The "No Digest" data are an average of three technical replicates (same sample measured three times), while the "NaOH Digest" data are an average of two experimental replicates, each with three technical replicates. The results showed that the NaOH method increased the measured mRNA concentration compared to the standard intact mRNA quantification method, ranging from 23-36% (Table 5) (Please see Example 13 for calculation of mRNA concentration from NMPs).

Because the pH may have an impact on the OD260, the pH of the digestion mixtures was also determined using standard techniques (Table 6). As seen in Table 6, the pH varied from 7.8-9.8 for the various digested samples, which suggested that a buffering system may be helpful.

TABLE 5

Comparison of mRNA Concentrations Determined by the QC Method (No Digest) to the Initial NaOH Digestion Method

| Gravimetric Standard | No Digest (microgram/mL) | NaOH Digestions (microgram/mL) | % Increase in mRNA Quant |
|---|---|---|---|
| mRNA-1 (1.78 mg/mL) | 1298 | 1721 | 33 |
| mRNA-2 (1.61 mg/mL) | 1233 | 1661 | 35 |
| mRNA-3 (1.61 mg/mL) | 1728 | 2355 | 36 |
| mRNA-4 (2.78 mg/mL) | 2923 | 3593 | 23 |
| mRNA-1 (2.92 mg/mL) | 570 | 772 | 36 |
| mRNA-2 (0.77 mg/mL) | 626 | 768 | 23 |
| mRNA-3 (0.75 mg/mL) | 485 | 643 | 33 |
| mRNA-4 (0.79 mg/mL) | 792 | 1000 | 26 |

TABLE 6

Average pH Values Obtained for the Digestion Mixtures Reported in Table 5.

| Gravimetric Standard | pH of Solution |
|---|---|
| mRNA-1 (1.78 mg/mL) | 9.8 ± 0.1 |
| mRNA-2 (1.61 mg/mL) | 7.8 ± 0.2 |
| mRNA-3 (1.61 mg/mL) | 8.2 ± 0.8 |
| mRNA-4 (2.78 mg/mL) | 9.5 ± 0.9 |
| mRNA-1 (2.92 mg/mL) | 9.2 ± 1.1 |
| mRNA-2 (0.77 mg/mL) | 9.1 ± 1.6 |
| mRNA-3 (0.75 mg/mL) | 9.0 ± 1.2 |
| mRNA-4 (0.79 mg/mL) | 8.6 ± 0.5 |

Figure 3:
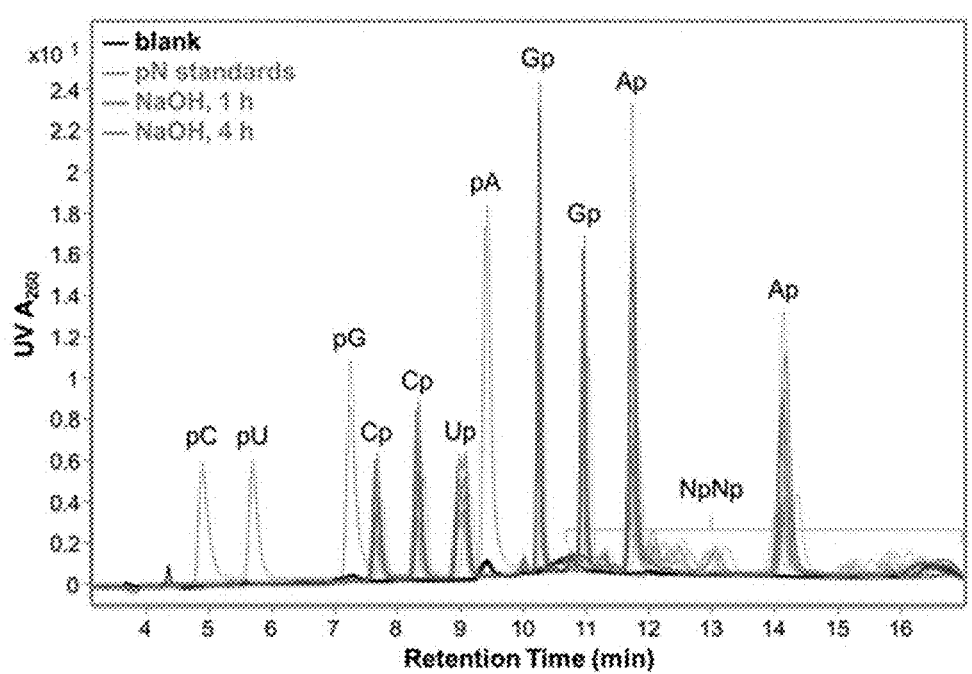
FIG. 3 illustrates a LC-UV-MS trace for mRNA-XX following treatment with NaOH for 1 hour (pink trace) or 4 hours (red trace). 5'-NMPs were included as nucleotide controls (green trace), in some embodiments.

Example 4. Base Degradation Yields 2' and 3' Nucleotide Monophosphate Products Intact mRNA standards were digested as described in Example 2 and analyzed using LC-UV-MS analysis. The LC-UV traces confirmed that 5' rNMP, which was included as a control, was not generated following NaOH digestion. Instead, the traces revealed the presence of two isomers for each NMP, which was attributed to the 2' rNMP and 3'rNMP, respectively, following MS detection. Importantly, the 2',3'-cyclic phosphate, which is the precursor to the 2' rNMP and 3'rNMP was not observed in the digestion mixture (FIG. 3).

Example 5: NaOH Digestion of mRNAQC Samples

The NaH digestion method was performed using 30 random mRNA QC samples. For this experiment, samples were selected at random from QC samples. Each sample was digested in triplicate using the optimized parameters and the OD260 was measured using the FLUOStar OMEGA spectrophotometer on an QC Hamilton (Table 7). The use of the NaOH digestion method resulted in an increase in the measured mRNA concentration (in this particular example the increase was ~21%.)

TABLE 7 mRNA Quantitative Results for Preclinical Production samples Utilizing the Optimized mRNA Quant Method Obtained from the DOE.

| Sample ID | QC Conc. (mg/mL) | NaOH Digest (mg/mL) | Change in mRNA Quant |
|---|---|---|---|
| 1 | 1.066 | 1.224 | 15% |
| 2 | 1.105 | 1.188 | 8% |
| 3 | 1.141 | 1.236 | 8% |
| 4 | 0.874 | 0.996 | 14% |
| 5 | 0.931 | 1.472 | 58% |
| 6 | 1.002 | 1.368 | 37% |
| 7 | 1.027 | 1.072 | 4% |
| 8 | 1.039 | 1.122 | 8% |
| 9 | 1.096 | 1.184 | 8% |
| 10 | 0.960 | 1.1 | 15% |
| 11 | 1.092 | 1.19 | 9% |
| 12 | 0.616 | 1.126 | 83% |
| 13 | 1.184 | 1.306 | 10% |
| 14 | 1.250 | 1.374 | 10% |
| 15 | 0.671 | 0.826 | 23% |
| 16 | 0.956 | 1.131 | 18% |
| 17 | 1.039 | 1.116 | 7% |
| 18 | 1.188 | 1.38 | 16% |
| 19 | 0.455 | 0.574 | 26% |
| 20 | 0.441 | 0.524 | 19% |
| 21 | 1.032 | 1.304 | 26% |
| 22 | 1.130 | 1.212 | 7% |
| 23 | 0.511 | 0.628 | 23% |
| 24 | 0.649 | 0.746 | 15% |
| 25 | 0.853 | 0.99 | 16% |
| 26 | 0.841 | 1.084 | 29% |
| 27 | 0.435 | 0.536 | 23% |
| 28 | 0.570 | 0.762 | 34% |
| 29 | 0.882 | 1.116 | 27% |
| 30 | 0.536 | 0.642 | 20% |

Example 6. Integrating NaOH Digestion with AEX-HPLC

Figure 4A:
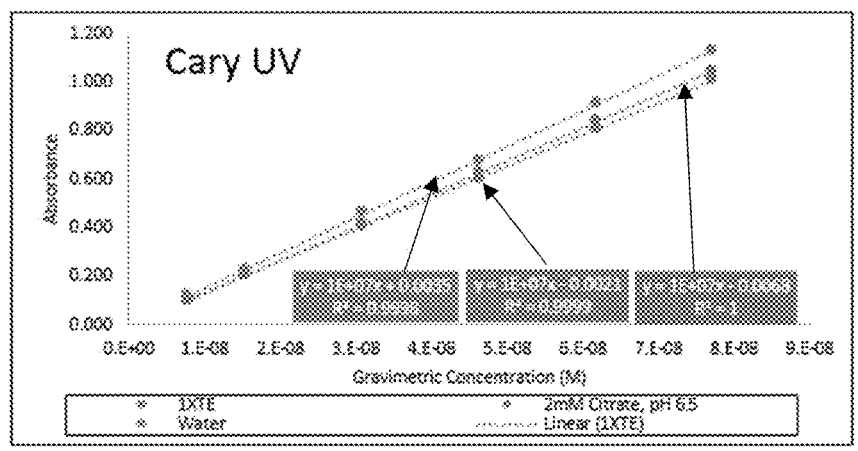
FIG. 4A illustrates a linear regression analysis performed on a plot of the absorbance at 260 nm as a function of buffer concentration measured on a Cary UV spectrophotometer. Buffers tested included TE buffer (lx), sodium citrate (2 mM, pH 6.5), and water, in some embodiments.
Figure 4B:
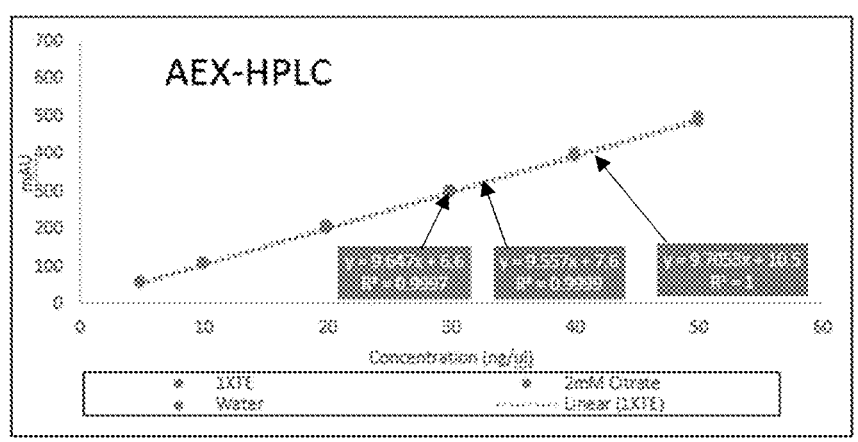
FIG. 4B illustrates a linear regression analysis performed on a plot of the absorbance at 260 nm as a function of buffer concentration measured on AEX-HPLC. Buffers tested included TE buffer (lx), sodium citrate (2 mM, pH 6.5), and water, in some embodiments.

The goal of this experiment was to demonstrate that the AEX-HPLC can be used to generate calibration curves of NaOH digested mRNAs of a specific lot, which can then be used to quantify a second lot of the same, but intact, mRNA construct (i.e. eliminates the need to do multiple NaOH digestions for a single mRNA construct). To do this, the effect of sample buffer on the OD260 was first evaluated using a Cary UV spectrophotometer and AEX-HPLC. Selected buffer samples included TE buffer, 2 mM NaCitrate, and water. As seen in FIG. 4, the presence of salt in the buffer solution decreased the OD260, relative to water when measured directly on the Cary UV spectrophotometer; however, when the samples were run through the AEX-HPLC, no such dependency was observed.

Next, mRNA-13, mRNA-15, and mRNA-17 were digested using the optimized NaOH digestion method disclosed herein. The concentrations obtained from the NaOH digestion method were then used to construct AEX-HPLC calibration curves. A second lot of the same intact mRNAs then were prepared, the OD260 measured, and the mRNA concentration determined via extrapolation using the first set of calibration curves generated. As shown in Table 8, measuring the OD260 of intact mRNAs from the second lot and determining their concentration via extrapolation using calibration curves derived from the first lot of digested samples was nearly identical to the values obtained via NaOH digestion of the second lot samples.

TABLE 8

Results Quantifying mRNA Determined by Using AEX-HPLC Calibration Curves Based on NaOH Digestion Results Method.

| Lot #1 | Lot #2 | RT | Area | Calculated Lot #2 Conc (mg/mL) from AEX Linear Curve of Lot #1 | Calculated Lot #2 Conc (mg/mL) from NaOH Digest |
|---|---|---|---|---|---|
| mRNA-13 | mRNA-14 | 2.78 | 749 | 2.3 | 2.2 |
|  | mRNA-14 | 2.78 | 749 | 2.3 | 2.2 |
|  | mRNA-14 | 2.78 | 742 | 2.3 | 2.2 |
|  | mRNA-16 | 2.78 | 820 | 1.9 | 1.9 |
| mRNA-15 | mRNA-16 | 2.78 | 818 | 1.9 | 1.9 |
|  | mRNA-16 | 2.78 | 819 | 1.9 | 1.9 |
| mRNA-17 | mRNA-18 | 2.77 | 704 | 2.3 | 2.3 |
|  | mRNA-18 | 2.77 | 710 | 2.4 | 2.3 |
|  | mRNA-18 | 2.77 | 706 | 2.4 | 2.3 |

Example 7. Determination of a Sequence-Corrected Molar Extinction Coefficient for Individual Nucleotides (NMPs)

Based on the discovery that rNMP concentration was not affected up to a NaCl concentration of 400 mM, a method was developed to quantify the concentration of intact mRNA from its constituent NMP building blocks. To do this, a parameter termed the mass-corrected molar extinction coefficient (MCC) was defined to equal the concentration of NMP required to give an absorbance reading of 1.0 AU at 260 nm using a 1 cm light path. The MCC can be determined as the inverse of the slope of a linear regression performed on a plot of the optical density at 260 nm (OD260) versus the NMP concentration ([NMP]).

The MCC for NMPs was determined using the following protocol: stock solutions of adenosine monophosphate (AMP), cytosine monophosphate (CMP), guanine monophosphate (GMP), 1-methyl-pseudouridine, 5-methyoxy-uridine, and 1-ethyl-pseudouridine were prepared by dissolving each solid into a digestion matrix comprising of 20% 1M HCl, 20% 1M NaOH and 60% 2 mM Sodium Citrate buffer (pH=6.5). Stock solutions were serially diluted five times and the UV absorbance was measured (in triplicate) at 260 nm (referred to as the optical density, OD260) using a Cytation 3 plate reader. The OD260 was plotted as a function of the nucleotide concentration and a linear regression analysis was performed to obtain the slope of the line. The MCC was calculated as 1/slope. A non-limiting example where the MCC of each nucleotide monophosphate was determined is shown in Table 9. For instance, adenosine was determined to be 24.2 microgram*cm/mL (Table 9).

TABLE 9

Values for experimentally determined MCCs

| NMP ID | MCC (microgram * cm/mL) |
| --- | --- |
| AMP | 24.2 |
| CMP | 44.2 |
| GMP | 29.5 |
| UMP | 42.3 |
| N1-Methyl-psiMP | 64.8 |
| 5-Methoxy-UMP | 92.3 |
| N1-Ethyl-psiMP | 63.6 |

Using the MCC, a sequence corrected molar extinction coefficient (SCC) was then defined according to Equation 6 (i.e. derived from first principles) and Equation 20 (i.e. derived from Beer's law for mixtures). Using the SCC, the initial concentration of the mRNA of interest can be calculated by multiplying the OD260/pathlength and the SCC according to Equations 5 and 21, respectively.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in some embodiments, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in some embodiments, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for determining a concentration of mRNA in a mRNA solution, the method comprising:
   measuring an absorbance of a nucleotide solution comprising a plurality of nucleotides; and
   determining the concentration of the mRNA in the mRNA solution based on (i) the measured absorbance of the nucleotide solution and (ii) a sequence corrected molar extinction coefficient (SCC) associated with nucleotide monophosphates present in a digested mRNA mixture.

2. The method of claim 1, wherein the plurality of nucleotides and/or the nucleotide solution comprise intact mRNA, and wherein the concentration of the mRNA is determined based on a calibration curve generated from the digested mRNA mixture.

3. The method of claim 1, wherein the nucleotide solution is the mRNA solution.

4. The method of claim 1, wherein the nucleotide solution is not the digested mRNA mixture.

5. The method of claim 1, wherein the plurality of nucleotides comprises a plurality of nucleotide monophosphates.

6. The method of claim 1, wherein the nucleotide solution is the digested mRNA mixture.

7. The method of claim 1, further comprising digesting the mRNA in the mRNA solution to form the digested mRNA mixture.

8. A method for determining a concentration of mRNA in a solution, comprising:
   digesting a mRNA mixture by adding a base to a solution of mRNA and incubating the mixture to digest the mRNA into nucleotide monophosphates;
   obtaining a plurality of mass-corrected coefficient values for each type of nucleotide in the digestion mixture;
   obtaining a plurality of sequence corrected molar extinction coefficient (SCC) values associated with nucleotide monophosphates present in the digested mRNA mixture based on (i) the plurality of mass-corrected coefficient values for each type of nucleotide in the nucleotide solution and (ii) relative percentage values for each type of nucleotide in the nucleotide solution;
   measuring the absorbance of the digested mixture; and,
   using the absorbance measurement and SCC to determine a concentration of the mRNA.

9. A method for preparing a set of sequence corrected molar extinction coefficient (SCC) values for an mRNA comprising:
   digesting a mRNA mixture by adding a base to a solution of mRNA and incubating the mixture to digest the mRNA into nucleotide monophosphates;
   obtaining a plurality of mass-corrected coefficient values for each type of nucleotide in the digestion mixture and using the plurality of mass-corrected coefficient values; and
   obtaining a plurality of sequence corrected molar extinction coefficient (SCC) values associated with nucleotide monophosphates present in the digested mRNA mixture based on (i) the plurality of mass-corrected coefficient values for each type of nucleotide in the nucleotide solution and (ii) relative percentage values for each type of nucleotide in the nucleotide solution.

10. The method of claim 8, wherein the determined concentration of the mRNA in the mRNA solution is further based on a pathlength and a dilution factor.

11. The method of claim 8, wherein the base comprises sodium hydroxide at a concentration of at least 0.8 N.

12. The method of claim 8, wherein the mixture is incubated at a temperature of about 60-70° C. and the absorbance is measured at 260 nm.

13. The method of claim 12, further comprising quenching the digestion by adding an acid solution to the mRNA mixture, wherein the acid solution comprises hydrochloric acid.

14. The method of claim 13, further comprising adding a buffer solution to the digested mixture, wherein the buffer solution comprises sodium citrate at a concentration of between 2 mM to 250 mM.

15. The method of claim 8, wherein the mRNA comprises at least one nucleotide selected from the group consisting of N1-methyl-pseudouridine, 5-methoxy-uridine, and N1-ethyl-pseudouridine.

16. The method of claim 1, wherein the mRNA comprises at least one chemically modified nucleotide.

17. A computer-implemented method for outputting a concentration of mRNA in a mRNA solution, the method comprising:
   receiving or inputting an absorbance measurement of a nucleotide solution comprising a plurality of nucleotides;
   receiving or inputting one or more of (i) a sequence corrected molar extinction coefficient (SCC) associated with nucleotide monophosphates present in a digested mRNA mixture, (ii) a plurality of mass-corrected coefficient values, wherein the plurality comprises a mass-corrected coefficient value for each type of the nucleotide monophosphates in the digestion mixture, and (iii) relative percent values for each type of the nucleotide monophosphates in the digestion mixture;
   determining the concentration of the mRNA based on (i) the absorbance measurement of the nucleotide solution and (ii) the one or more of the SCC, the plurality of mass-corrected coefficient values, and the relative percent values; and
   outputting the concentration of the mRNA in the solution.

18. The method of claim 17, wherein the plurality of nucleotides and/or nucleotide solution comprises intact mRNA, and wherein concentration of the mRNA is determined based on a calibration curve generated from the digested mRNA mixture.

19. The method claim 17, wherein the nucleotide solution is the mRNA solution.

20. The method of claim 17, wherein the nucleotide solution is not the digested mRNA mixture.

21. The method of claim 17, wherein the plurality of nucleotides comprises a plurality of nucleotide monophosphates.

22. The method of claim 17, wherein the nucleotide solution is the digested mRNA mixture.

23. The method of claim 17, further comprising digesting the mRNA in the mRNA solution to form the digested mRNA mixture.

24. The method of claim 17, wherein the plurality of nucleotides comprises at least one chemically modified nucleotide.

25. A method for determining a concentration of mRNA in a solution, the method comprising:
   at least one computer hardware processor to perform:
   obtaining an absorbance measurement of a nucleotide solution comprising a plurality of nucleotides;
   obtaining one or more of (i) a sequence corrected molar extinction coefficient (SCC) associated with nucleotide monophosphates present in a digested mRNA mixture, (ii) a plurality of mass-corrected coefficient values, wherein the plurality comprises a mass-corrected coefficient value for each type of the nucleotide monophosphates in the digestion mixture, and (iii) relative percent values for each type of the nucleotide monophosphates in the digestion mixture;

determining the concentration of the mRNA based on (i) the absorbance measurement of the nucleotide solution and (ii) the one or more of the SCC, the plurality of mass-corrected coefficient values, and the relative percent values; and outputting the concentration of the mRNA in the solution.

26. The method of claim 25, further comprising adjusting the volume of the solution to achieve a therapeutic dose of the mRNA in the solution based on the calculated concentration of the mRNA in the solution.

27. The method of claim 25, wherein determining of the mRNA concentration using plurality of mass-corrected coefficient values accounts for secondary structure and intramolecular interactions within the mRNA.

28. The method of claim 25, wherein the base comprises sodium hydroxide and the absorbance is measured at 260 nm using an ultraviolet visible spectrophotometer.

29. The method of claim 25, wherein the spectrophotometer is selected from the group consisting of the Nanodrop 2000 spectrophotometer, the BioTek Synergy spectrophotometer, and the FLUOstar OMEGA.

30. The method of claim 25, wherein the plurality of nucleotides comprises at least one chemically modified nucleotide.

* * * * *